United States Patent
Koshihara

(10) Patent No.: US 10,720,092 B2
(45) Date of Patent: Jul. 21, 2020

(54) ELECTRO-OPTICAL APPARATUS AND ELECTRONIC APPARATUS

(71) Applicant: SEIKO EPSON CORPORATION, Tokyo (JP)

(72) Inventor: Takeshi Koshihara, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/162,730

(22) Filed: Oct. 17, 2018

(65) Prior Publication Data

US 2019/0051231 A1 Feb. 14, 2019

Related U.S. Application Data

(62) Division of application No. 15/422,780, filed on Feb. 2, 2017, now Pat. No. 10,140,906.

(30) Foreign Application Priority Data

Feb. 15, 2016 (JP) .................................. 2016-026413

(51) Int. Cl.
*G02B 27/01* (2006.01)
*G09G 3/20* (2006.01)
(Continued)

(52) U.S. Cl.
CPC ......... *G09G 3/2003* (2013.01); *G09G 3/3225* (2013.01); *G02B 5/201* (2013.01);
(Continued)

(58) Field of Classification Search
CPC .............. G09G 3/3208; G09G 3/3225; H01M 10/0525; H01M 2004/021;
(Continued)

(56) References Cited

U.S. PATENT DOCUMENTS 6,025,899 A * 2/2000 Fukunaga ......... G02F 1/133516
349/115
6,552,488 B1 4/2003 Roitman et al.
(Continued)

FOREIGN PATENT DOCUMENTS

JP 2001-126864 A 5/2001
JP 2009-145620 A 7/2009
(Continued)

OTHER PUBLICATIONS

May 9, 2018 Office Action Issued in U.S. Appl. No. 15/422,780.
Jul. 30, 2018 Notice of Allowance issued n U.S. Appl. No. 15/422,780.

*Primary Examiner* — Richard J Hong
(74) *Attorney, Agent, or Firm* — Oliff PLC

(57) ABSTRACT

An optical axis of a light emitting element is inclined against a normal line of a light emitting surface of the light emitting element to a central side of a display area in a row direction according to positions of subpixels in the row direction, and the optical axis is inclined against the normal line of the light emitting surface to the central side of the display area in a column direction according to the positions of the subpixels in the column direction. A range of inclination of the optical axis is different in the row direction and the column direction. In the row direction and the column direction, the subpixels are disposed such that color filters of the same color are arranged in a direction in which the range of inclination becomes larger, and color filters of colors which are different from each other are arranged in another direction.

16 Claims, 22 Drawing Sheets

(51) Int. Cl.
*G09G 3/3225* (2016.01)
*G02B 5/20* (2006.01)
*G09G 3/3208* (2016.01)

(52) U.S. Cl.
CPC ......... *G02B 27/017* (2013.01); *G09G 3/3208* (2013.01); *G09G 2300/0443* (2013.01); *G09G 2300/0452* (2013.01); *G09G 2320/068* (2013.01)

(58) Field of Classification Search
CPC ..... H01M 2004/027; H01M 2004/028; H01M 2220/20; H01M 4/131; H01M 4/133; H01M 4/505; H01M 4/525; H01M 4/587; H01M 4/623; H01M 4/625; H01M 4/661; Y02T 10/7011; G02B 5/201; H01L 27/3213; H01L 27/3246; H01L 27/3248; H01L 27/1259; H01L 51/5265; G02F 1/133514; G02F 1/133512; G02F 1/133516
See application file for complete search history.

(56) References Cited

U.S. PATENT DOCUMENTS

| | | |
|---|---|---|
| 2003/0001797 A1 | 1/2003 | Sato et al. |
| 2003/0038904 A1* | 2/2003 | Kaneko ............ G02F 1/133512 349/110 |
| 2005/0195162 A1 | 9/2005 | Sato et al. |
| 2005/0195192 A1 | 9/2005 | Sato et al. |
| 2007/0123135 A1* | 5/2007 | Yang .................... H01L 27/3213 445/24 |
| 2009/0167996 A1* | 7/2009 | Takahashi ......... G02F 1/133512 349/106 |
| 2010/0188624 A1* | 7/2010 | Lee ........................ G02B 5/201 349/106 |
| 2011/0155296 A1* | 6/2011 | Nakamura ............. G02B 5/201 156/67 |
| 2011/0181960 A1 | 7/2011 | Tanijiri |
| 2013/0222896 A1 | 8/2013 | Komatsu et al. |
| 2014/0117339 A1* | 5/2014 | Seo ..................... H01L 27/3246 257/40 |
| 2014/0117842 A1* | 5/2014 | Hanamura .......... H01L 27/3248 313/504 |
| 2014/0267636 A1 | 9/2014 | Takagi et al. |
| 2015/0155346 A1* | 6/2015 | Motoyama .......... H01L 51/5265 257/89 |
| 2015/0270319 A1 | 9/2015 | Ishii et al. |
| 2015/0355500 A1* | 12/2015 | Kwon ................. H01L 27/1259 349/43 |
| 2015/0362795 A1* | 12/2015 | Chen ................. G02F 1/133514 349/42 |

FOREIGN PATENT DOCUMENTS

| | | |
|---|---|---|
| JP | 2011-203684 A | 10/2011 |
| JP | 2013-200553 A | 10/2013 |
| JP | 2015-185227 A | 10/2015 |
| JP | 2017-181831 A | 10/2017 |
| WO | 01/59509 A1 | 8/2001 |

* cited by examiner (μm)

|  | UPPER SECTION (U) | CENTRAL SECTION (C) | LOWER SECTION (L) |
|---|---|---|---|
| R− | −0.250 | −0.250 | −0.125 |
| R+ | 0.200 | 0.200 | 0.275 |
| G− | −0.000 | −0.000 | −0.250 |
| G+ | 0.275 | 0.400 | 0.250 |
| B− | −0.450 | −0.200 | −0.050 |
| B+ | 0.200 | 0.200 | 0.025 |

ELECTRO-OPTICAL APPARATUS AND ELECTRONIC APPARATUS

CROSS REFERENCE TO RELATED APPLICATION

This application is a divisional application of U.S. application Ser. No. 15/422,780, filed Feb. 2, 2017, the contents of which are incorporated herein by reference.

BACKGROUND

1. Technical Field

The present disclosure relates to technical fields of an electro-optical apparatus and an electronic apparatus.

2. Related Art

In recent years, a head-mounted display in a type of guiding image light from an electro-optical apparatus to the pupil of an observer using an Organic Light Emitting Diode (OLED) as a light emitting element has been proposed as an electronic apparatus, such as a head-mounted display, which enables a virtual image to be formed. For example, in a head-mounted display disclosed in JP-A-2009-145620, a see-through optical system is used which overlaps image light with external light.

In order to display color image light in the head-mounted display, a display panel which includes color filters disclosed in, for example, JP-A-2001-126864 is used. In JP-A-2001-126864, the color filters are disposed right over light emitting positions of the display panel. Therefore, viewing angle characteristics of the display panel are secured around a direction perpendicular to a display surface of the display panel. The reason for this is that a using method is assumed in which the display panel is viewed from a front surface.

In order to use the display panel disclosed in JP-A-2001-126864 in the head-mounted display and to reduce a size of the head-mounted display, it is necessary to reduce a size of the display panel. However, in a case where the size of the display panel is reduced, it is necessary to increase viewing angles of pixels which are positioned on the outer side of the display area. However, in a display panel according to the related art, color filters are disposed right over the light emitting positions, and thus there is a limit to increase the viewing angles. As a result, it is difficult to secure excellent viewing angle characteristics.

SUMMARY

An advantage of some aspects of the embodiment is that an electro-optical apparatus and an electronic apparatus including the electro-optical apparatus are provided in which it is possible to improve viewing angle characteristics even in a case where a size of a display panel is reduced.

According to an aspect of the embodiment, there is provided an electro-optical apparatus including a plurality of subpixels each of which is arranged in a first direction of a display area and a second direction which is a direction intersecting with the first direction, each of the plurality of subpixels includes a light emitting element, and a color filter, the plurality of subpixels includes color filters of different colors, and have different display colors corresponding to the color filters, the plurality of subpixels includes light emitting elements in which optical axes of the light emitting elements are inclined against respective normal lines of light emitting surfaces of the light emitting elements to a central side of the display area according to respective positions of the subpixels, ranges, in which the optical axes of the light emitting elements are inclined, are different in the first direction and the second direction, and, in the first direction and the second direction, the plurality of subpixels are disposed such that color filters of the same color are arranged in one direction in which a range in the ranges is large, and color filters of colors which are different from each other are arranged in another direction.

According to the aspect, the electro-optical apparatus includes the plurality of subpixels that are arranged in a first direction of the display area and a second direction which is a direction intersecting with the first direction, for example, in a row direction and a column direction. The light emitting element of each of the plurality of subpixels includes an optical axis which is inclined to a central side of the display area against a normal line of the light emitting surface of the light emitting element according to a position of each of the subpixels. For example, when viewed from a center of the display area in a certain row, a light emitting element of the subpixel, which is positioned on the outer side of the row, has the optical axis which is inclined to the central side of the display area. In addition, for example, when viewed from a center of the display area in a certain column, a light emitting element of the subpixel, which is positioned on the outer side of the column, has the optical axis which is inclined to the central side of the display area. A range, in which the optical axes of the light emitting elements included in the plurality of subpixels are inclined, is different, for example, in the row direction and the column direction. The plurality of subpixels are disposed such that color filters of the same color are arranged in a direction, in which the range of inclination becomes larger, in the directions. Even though the optical axes of the light emitting elements of the subpixels, which are positioned on the outer side in the direction, are largely inclined from the center of the display area in the direction, the color filters of the same color are disposed to be arranged in the direction. Therefore, an inclined ray is not influenced by a color filter of another color, and viewing angle characteristics are improved.

In the electro-optical apparatus according to the aspect, in the plurality of subpixels includes color filters in which central positions in the another direction may be deviated from respective central positions of the light emitting surfaces of the light emitting elements in the another direction. According to the aspect, the color filters of colors, which are different from each other, are disposed to be arranged in another direction. However, the color filters are deviated to the central side of the display area in another direction corresponding to the inclinations of the optical axes. Therefore, it is possible to adjust influence of the color filters of the respective colors corresponding to the inclined ray, and thus the viewing angle characteristics are improved.

In the electro-optical apparatus according to the aspect, the plurality of subpixels may include color filters disposed to overlap adjacent color filters in the another direction in a plan view, and disposed to have different widths of overlap in a plan view according to the positions of the subpixels in the another direction. According to the aspect, the color filters of different colors are disposed to overlap with each other in another direction in a plan view. Therefore, it is possible to adjust a degree of the influence of the color filters of the respective colors corresponding to the inclined ray by a degree of overlap of the color filters. As a result, the viewing angle characteristics are improved.

In the electro-optical apparatus according to the aspect, the plurality of subpixels may include subpixels repeatedly disposed in order of a red color filter, a green color filter, and a blue color filter in the another direction, and, with regard to inclination, a width in which the green color filter overlaps the red color filter in a plan view may become smaller as the inclination in the order direction becomes larger. According to the aspect, with regard to the inclination of the optical axes, as the inclination of the order direction becomes larger, a red color ray is shifted to a short wavelength side. However, since a width which functions as the green color filter becomes narrower, the quantity of light of a green color ray is suppressed. As a result, a chromaticity deviation is suppressed, and thus the viewing angle characteristics are improved.

In the electro-optical apparatus according to the aspect, the plurality of subpixels may include subpixels repeatedly disposed in order of a red color filter, a green color filter, and a blue color filter in the another direction, and, with regard to inclination, a width in which the green color filter overlaps the red color filter in a plan view may become larger as the inclination in a direction reverse to the order direction becomes larger. According to the aspect, with regard to the inclination of the optical axes, as the inclination between the order direction and the reverse direction becomes larger, a green color ray is shifted to the short wavelength side. However, since a width which functions as the green color filter becomes wider, the quantity of light of the green color ray increases. As a result, the chromaticity deviation is suppressed, and thus the viewing angle characteristics are improved.

In the electro-optical apparatus according to the aspect, the plurality of subpixels may include subpixels repeatedly disposed in order of a red color filter, a green color filter, and a blue color filter in the another direction, and, with regard to inclination, a width in which the green color filter overlaps the blue color filter in a plan view may become smaller as the inclination in a direction reverse to the order direction becomes larger. According to the aspect, with regard to the inclination of the optical axes, as the inclination between the order direction and the reverse direction becomes larger, a blue color ray is shifted to the short wavelength side. However, a width which functions as the blue color filter becomes wider, the quantity of light of the blue color ray increases. As a result, the chromaticity deviation is suppressed, and thus the viewing angle characteristics are improved.

In the electro-optical apparatus according to the aspect, the plurality of subpixels may include subpixels repeatedly disposed in order of a red color filter, a green color filter, and a blue color filter in the another direction, and, with regard to inclination, a width in which the red color filter overlaps the blue color filter in a plan view may become smaller as the inclination in a direction reverse to the order direction becomes larger. According to the aspect, with regard to the inclination of the optical axes, as the inclination between the order direction and the reverse direction becomes larger, the blue color ray is shifted to the short wavelength side. However, since a width which functions as the blue color filter that overlaps the red color filter becomes wider, the quantity of light of the blue color ray increases. As a result, the chromaticity deviation is suppressed, and thus the viewing angle characteristics are improved.

In the electro-optical apparatus according to the aspect, the plurality of subpixels may include subpixels repeatedly disposed in order of a red color filter, a green color filter, and a blue color filter in the another direction, and, with regard to inclination, a width in which the red color filter overlaps the green color filter in a plan view may become larger as the inclination in a direction reverse to the order direction becomes larger. According to the aspect, with regard to the inclination of the optical axes, as the inclination between the order direction and the reverse direction becomes larger, the blue color ray is shifted to the short wavelength side. However, since a width which functions as the blue color filter that overlaps the green color filter becomes wider, the quantity of light of the blue color ray increases. As a result, the chromaticity deviation is suppressed, and thus the viewing angle characteristics are improved.

In the electro-optical apparatus according to the aspect, the plurality of subpixels may include subpixels repeatedly disposed in order of a red color filter, a green color filter, and a blue color filter in the another direction, and, with regard to inclination, a width in which the blue color filter overlaps the green color filter in a plan view may become larger as the inclination of the order direction becomes larger. According to the aspect, with regard to the inclination of the optical axes, as the inclination of the order direction becomes larger, the blue color ray is shifted to the short wavelength side. However, since a width which functions as the blue color filter that overlaps the green color filter becomes wider, the quantity of light of the blue color ray increases. As a result, the chromaticity deviation is suppressed, and thus the viewing angle characteristics are improved.

In the electro-optical apparatus according to the aspect, the plurality of subpixels may include subpixels repeatedly disposed in order of a red color filter, a green color filter, and a blue color filter in the another direction, and, with regard to inclination, a width in which the blue color filter overlaps the red color filter in a plan view may become smaller as the inclination in a direction reverse to the order direction becomes larger. According to the aspect, with regard to the inclination of the optical axes, as the inclination between the order direction and the reverse direction becomes larger, an extraction efficiency of the red color ray is lowered. However, since a width which functions as the red color filter that overlaps the blue color filter becomes wider, the quantity of light of the red color ray increases. As a result, the chromaticity deviation is suppressed, and thus the viewing angle characteristics are improved.

In the electro-optical apparatus according to the aspect, the plurality of subpixels may include subpixels repeatedly disposed in order of a red color filter, a green color filter, and a blue color filter in the another direction, and, as the inclination becomes larger, a width in which the red color filter overlaps the color filter of another color over the red subpixel in a plan view may be small. According to the aspect, even in the case where the red color ray is shifted to the short wavelength side as the inclination of the optical axis becomes larger, the width which functions as the red color filter becomes wider, and thus the quantity of light of the red color ray increases. As a result, the chromaticity deviation is suppressed, and thus the viewing angle characteristics are improved.

Subsequently, according to another aspect of the embodiment, there is provided an electronic apparatus including the electro-optical apparatus according to the aspect of the embodiment. There is provided the electronic apparatus, which has excellent viewing angle characteristics and high image quality, using the electro-optical apparatus which includes light emitting elements such as OLEDs.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Figure 1:
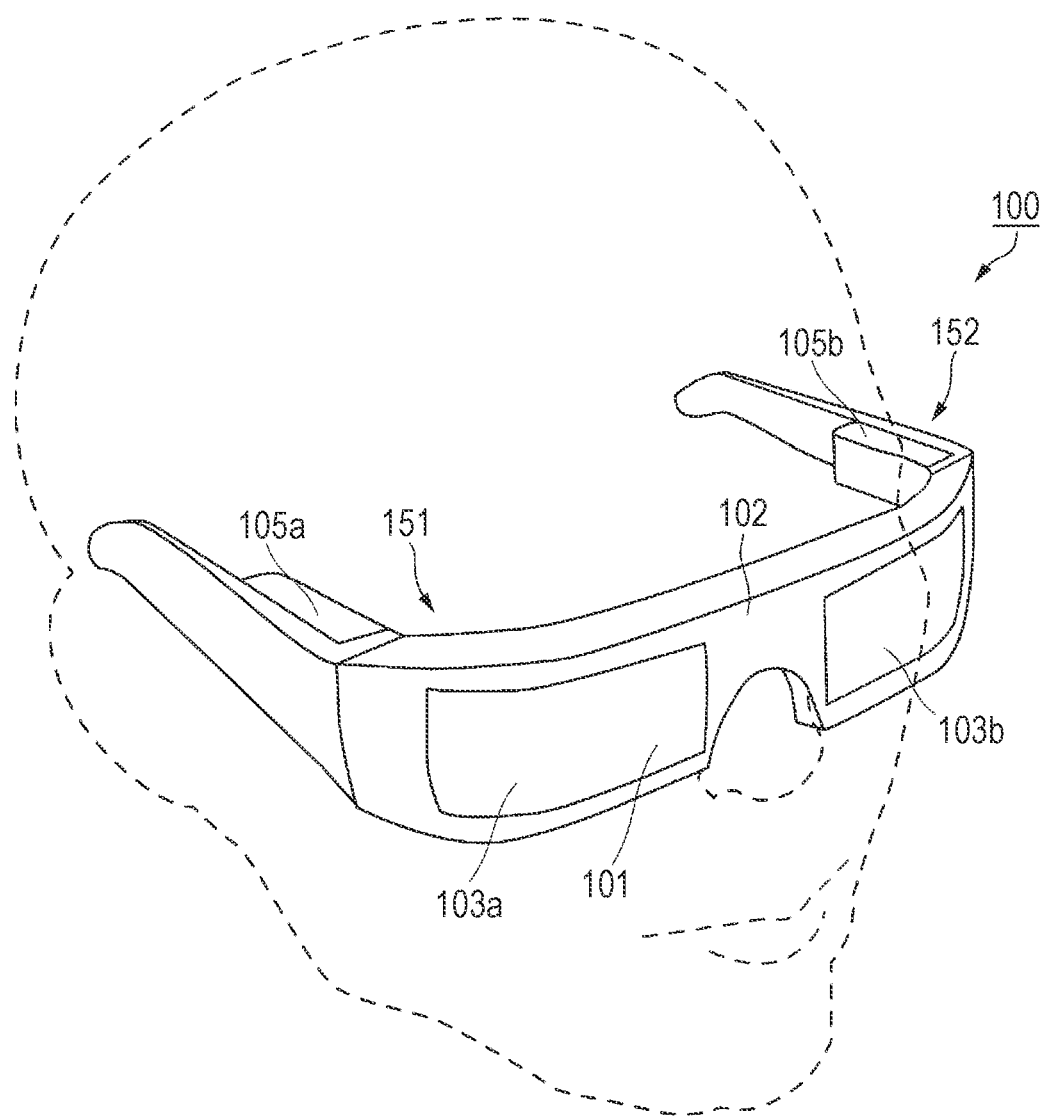
FIG. 1 is a diagram illustrating a concept of an electronic apparatus according to an embodiment.

FIG. 1 is a diagram illustrating a concept of an electronic apparatus according to an embodiment. First, the concept of the electronic apparatus will be described with reference to FIG. 1.

A head-mounted display 100 is an example of the electronic apparatus according to the embodiment. As illustrated in FIG. 1, the head-mounted display 100 has appearance like glasses. The head-mounted display 100 causes a user who wears the head-mounted display 100 to visually recognize image light which forms an image, and causes the user to visually recognize external light in a see-through manner. The head-mounted display 100 has a see-through function of superimposing the external light and image light and displaying the superimposed light, has a wide viewing angle and high performance, and is small and light.

The head-mounted display 100 includes a see-through member 101 that covers the front of user's eyes, a frame 102 that supports the see-through member 101, a first built-in device section 105a and a second built-in device section 105b that are appended to parts from cover sections of both the right and left ends of the frame 102 to string parts (temples) on the rear sides. The see-through member 101 is a thick and bent optical member (transmissive eye cover) that covers the front of user's eyes, and is divided into a first optical part 103a and a second optical part 103b. A first display machine 151, in which the first optical part 103a is combined with the first built-in device section 105a, on the left side of FIG. 1 is a part that displays a virtual image for right eye in see-through manner, and individually functions as an electronic apparatus to which a display function is added. In addition, second display machine 152, in which the second optical part 103b is combined with the second built-in device section 105b, on the right side of FIG. 1 is a part that forms a virtual image for left eye in see-through manner, and individually functions as the electronic apparatus to which the display function is added.

Figure 2:
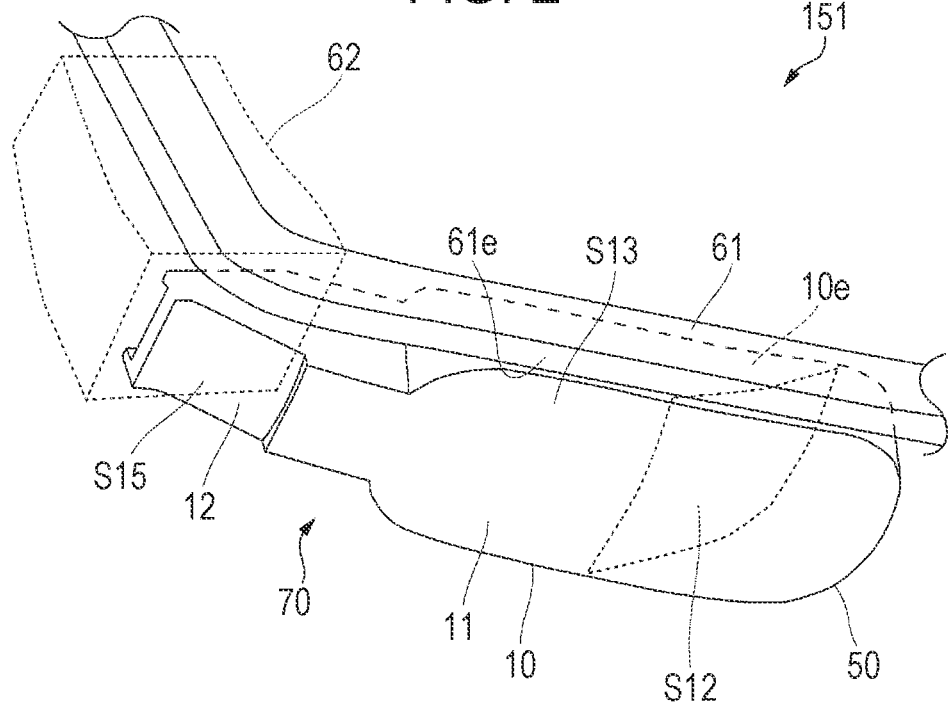
FIG. 2 is a diagram illustrating an internal structure of the electronic apparatus according to the embodiment.
Figure 3:
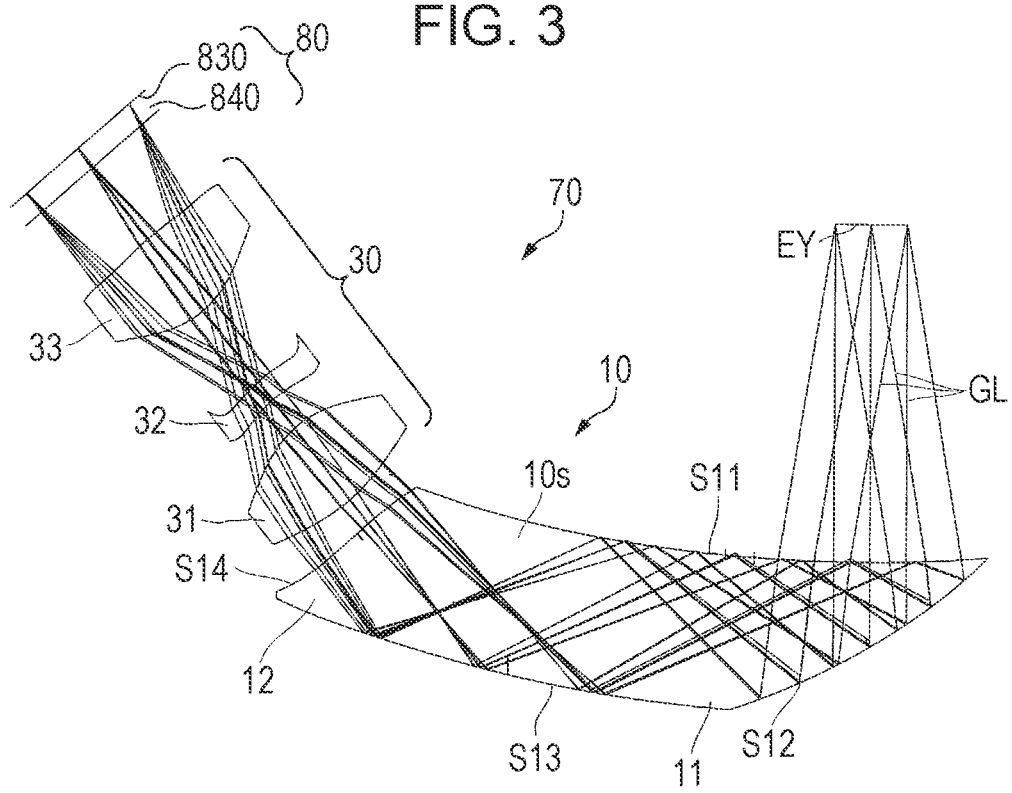
FIG. 3 is a diagram illustrating an optical system of the electronic apparatus according to the embodiment.

FIG. 2 is a diagram illustrating an internal structure of the electronic apparatus according to the embodiment. FIG. 3 is a diagram illustrating an optical system of the electronic apparatus according to the embodiment. Subsequently, the internal structure and the optical system of the electronic apparatus will be described with reference to FIGS. 2 and 3. Meanwhile, although the first display machine 151 is described as an example of the electronic apparatus in FIGS. 2 and 3, the second display machine 152 has symmetrically almost the same structure.

As illustrated in FIG. 2, the first display machine 151 includes a projection and see-through device 70, and an electro-optical device 80 (refer to FIG. 3) which is attached to one end of a lens barrel 62. Meanwhile, in FIG. 2, the electro-optical device 80 is not illustrated. The projection and see-through device 70 includes a prism 10 that is a light guide member, a light transmissive member 50, and an image-formation projection lens 30 (refer to FIG. 3) illustrated in FIG. 3. In FIG. 2, the projection lens 30 is not illustrated. The prism 10 and the light transmissive member 50 are integrated through bonding, and are completely fixed to, for example, a lower side of the frame 61 such that an upper surface 10e of the prism 10 is connected to the lower surface 61e of the frame 61. The projection lens 30 illustrated in FIG. 3 is stored in the lens barrel 62, and is attached to an end of the prism 10 through the lens barrel 62. The prism 10 and the light transmissive member 50 in the projection and see-through device 70 corresponds to the first optical part 103a in FIG. 1, and the projection lens 30 and the electro-optical device 80 in the projection and see-through device 70 corresponds to the first built-in device section 105a in FIG. 1.

In the projection and see-through device 70, the prism 10 is an arc-shaped member that is bent along a face in a plan view, and can be separately considered as a first prism part 11 on a central side which is near to a nose, and a second prism part 12 on a peripheral side which is far from the nose. The first prism part 11 is disposed on a side where light is emitted, and includes a first surface S11, a second surface S12, and a third surface S13, which are illustrated in FIG. 3, as surfaces on sides which have optical functions. The second prism part 12 is disposed on a side to which light is incident, and includes a fourth surface S14 and a fifth surface S15, which are illustrated in FIG. 3, as surfaces on sides which have optical functions. Here, the first surface S11 is adjacent to the fourth surface S14, the third surface S13 is adjacent to the fifth surface S15, and the second surface S12 is disposed between the first surface S11 and the third surface S13. In addition, the prism 10 has the upper surface 10e that is adjacent from the first surface S11 to the fourth surface S14.

The prism 10 is formed of a resin material that shows high light permeability in a visible range, and is formed by, for example, injecting and solidifying a thermoplastic resin into a mold. Although a main body part 10s of the prism 10 illustrated in FIG. 3 is formed by an integrated product, the main body part 10s can be separately considered as the first prism part 11 and the second prism part 12. The first prism part 11 enables wave guide and emission of the image light, and enables see-through of the external light. The second prism part 12 enables entering and wave guide of the image light.

The light transmissive member 50 is integrally attached to the prism 10. The light transmissive member 50 is a member (auxiliary prism) which assists the see-through function of the prism 10. The light transmissive member 50 shows a high light permeability in the visible range, and is formed of a resin material that has approximately the same refractive index as the main body part 10s of the prism 10 illustrated in FIG. 3. The light transmissive member 50 is formed through, for example, molding of the thermoplastic resin.

As illustrated in FIG. 3, the projection lens 30 includes, for example, three lenses 31, 32, and 33 along an incident-side optical axis. Each of the lenses 31, 32, and 33 is a lens which is rotationally symmetrical to a central axis of a light-incident surface of the lens, and includes at least one or more aspherical lenses. The projection lens 30 causes image light GL, which is emitted from the electro-optical device 80, to be incident into the prism 10, and re-forms an image on an eye EY. The projection lens 30 is a relay optical system for re-forming an image corresponding to the image light GL, which is emitted from each of the pixels of the electro-optical device 80, on an eye EY through the prism 10. The projection lens 30 is maintained in the lens barrel 62 illustrated in FIG. 2, and the electro-optical device 80 is attached to one end of the lens barrel 62 illustrated in FIG. 2. The second prism part 12 of the prism 10 is connected to the lens barrel 62 which maintains the projection lens 30, and indirectly supports the projection lens 30 and the electro-optical device 80.

Figure 4:
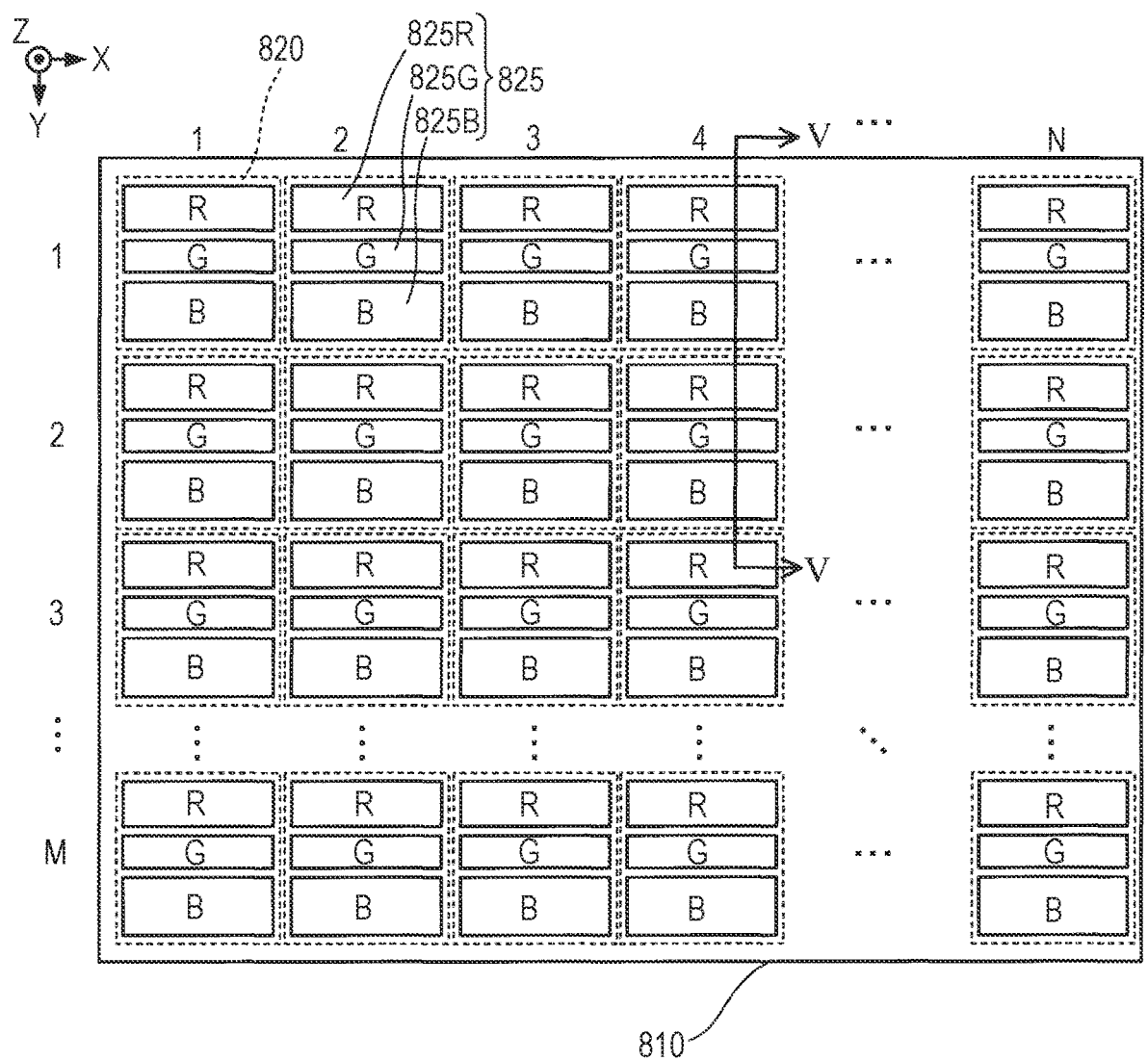
FIG. 4 is a diagram illustrating disposition of subpixels in a display area of an electro-optical apparatus according to the embodiment.
Figure 5:
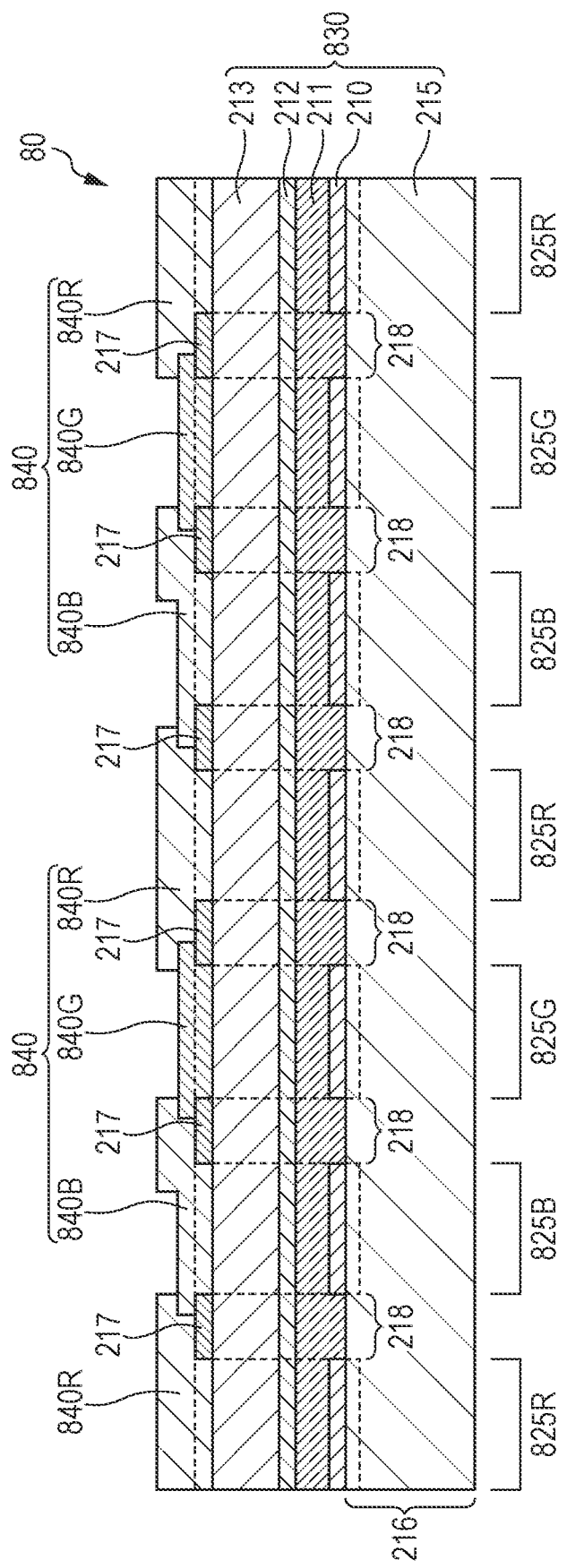
FIG. 5 is a sectional view taken along line V-V of FIG. 4.

FIG. 4 is a diagram illustrating disposition of subpixels in a display area of the electro-optical device 80. FIG. 5 is a sectional view taken along line V-V of FIG. 4. As illustrated in FIG. 4, pixels 820 are disposed in a matrix shape including M rows and N columns in the electro-optical device 80. M and N are integer numbers which are equal to or larger than 2, and it is assumed that M=720 and N=1280 as an example in the embodiment. Each of the pixels 820 includes three subpixels 825. The subpixels 825 include a red subpixel 825R, a green subpixel 825G, and a blue subpixel 825B. Each of the subpixels 825 includes a light emitting element 830, and a color filter 840, through which light emitted from the light emitting element 830 passes, as illustrated in FIG. 5. The color filter 840 includes a red color filter 840R, a green color filter 840G, and a blue color filter 840B.

The light emitting element 830 emits white light, and an organic EL element is used as an example of the light emitting element 830 in the embodiment. It is possible to use another LED element, a semiconductor laser element, and the like as the light emitting element 830. The red subpixel 825R, the green subpixel 825G, and the blue subpixel 825B respectively include the red color filter 840R, the green color filter 840G, and the blue color filter 840B. The red color filter 840R, the green color filter 840G, and the blue color filter 840B convert light from the corresponding light emitting element 830 into red light, green light, and blue light, and forms the image light GL.

As illustrated in FIG. 5, the electro-optical device 80 includes a substrate main body 215, an element substrate 216, banks 217, pixel electrodes 210, an organic light emitting layer 211, common electrodes 212, a protection layer 213, and separation sections 218 which are positioned between the pixel electrodes 210. The separation sections 218 indicate areas that are positioned between the pixel electrodes 210 (between the subpixels 825R, 825G, and 825B) in a plan view and that separate the pixel electrodes 210. A plurality of transistors, which are not illustrated in the drawing, are formed on the substrate main body 215.

The banks 217 are disposed in a lattice shape in a direction (a column direction (Y direction) in FIG. 4) which crosses the red color filter 840R, the green color filter 840G, and the blue color filter 840B, whose colors are different from each other, and in a direction (a row direction (X direction) in FIG. 4) which crosses the same-colored-color filters 840. In the embodiment, although the banks 217 are formed of a transparent material, such as silicon dioxide, the banks 217 may be formed of an organic material such as a photosensitive resin.

The pixel electrode 210 is formed of, for example, a light transmitting conductive material such as Indium Tin Oxide (ITO). In addition, the common electrode 212 functions as a semi transmission reflection layer that has a property (semi transmitting reflectivity) of transmitting a part of light which reaches the surface and reflecting remaining light. For example, the common electrode 212 having semi transmitting reflectivity is formed by sufficiently forming a conductive material, such as an alloy which includes silver or magnesium, which has light reflectivity, with a thin thickness. Meanwhile, although not illustrated in the drawing, a reflection layer is formed on a lower layer of the pixel electrode 210. Current is supplied form the pixel electrode 210 and the common electrode 212 to the organic light emitting layer 211 which is interposed between the pixel electrode 210 and the common electrode 212, and light is radiated from the organic light emitting layer 211. The light radiated from the organic light emitting layer 211 reciprocates between the reflection layer and the common electrode 212, passes through the common electrode 212 and is emitted to an observation side (side opposite to the substrate main body 215) after a component having a specific resonant wavelength is selectively amplified. That is, a resonance structure is formed in which light emitted from the organic light emitting layer is resonated between the reflection layer and the common electrode 212 which functions as the semi transmission reflection layer. Although not illustrated in the drawing, an optical path adjustment layer is formed between the substrate main body 215 and the pixel electrode 210, and functions as an element for individually setting a resonant wavelength (display color) of the resonance structure for each display color of the subpixel 825. Specifically, the resonant wavelength of light emitted from each subpixel 825 is set for each display color by appropriately adjusting an optical path length (optical distance) between the reflection layer and the common electrode 212, which forms the resonance structure according to a thickness of the optical path adjustment layer.

As described above, the electro-optical device 80 is downsized in order to be used in the head-mounted display 100 illustrated in FIG. 1. As a result, it is necessary to increase viewing angles of the pixels 820 which are positioned on the outer side of a display area 810 illustrated in FIG. 4. In order to increase the viewing angle, a principal ray of the subpixels 825, which are positioned on the outer side of the display area 810, is inclined. Generally, a range of inclination of the principal ray, that is, a range from a maximum value of an angle of inclination of the principal ray in one direction against a normal line of the light emitting surface of the subpixel 825 to a maximum value of the angle of inclination of the principal ray in another direction is different in the row direction and the column direction of the display area.

Figure 6:
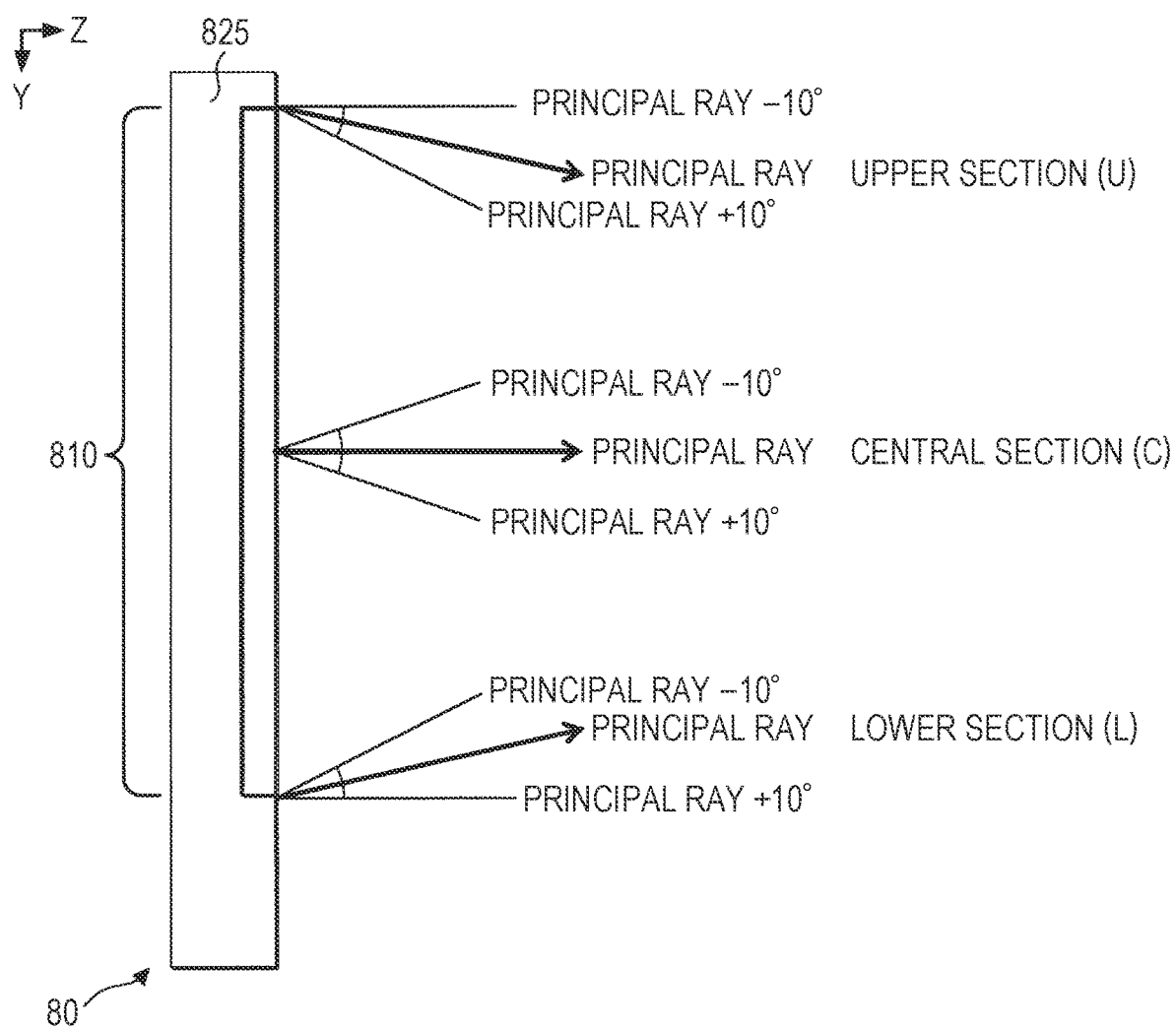
FIG. 6 is a diagram illustrating an angle of inclination of a principal ray in a column direction (Y direction) of the display area.
Figure 7:
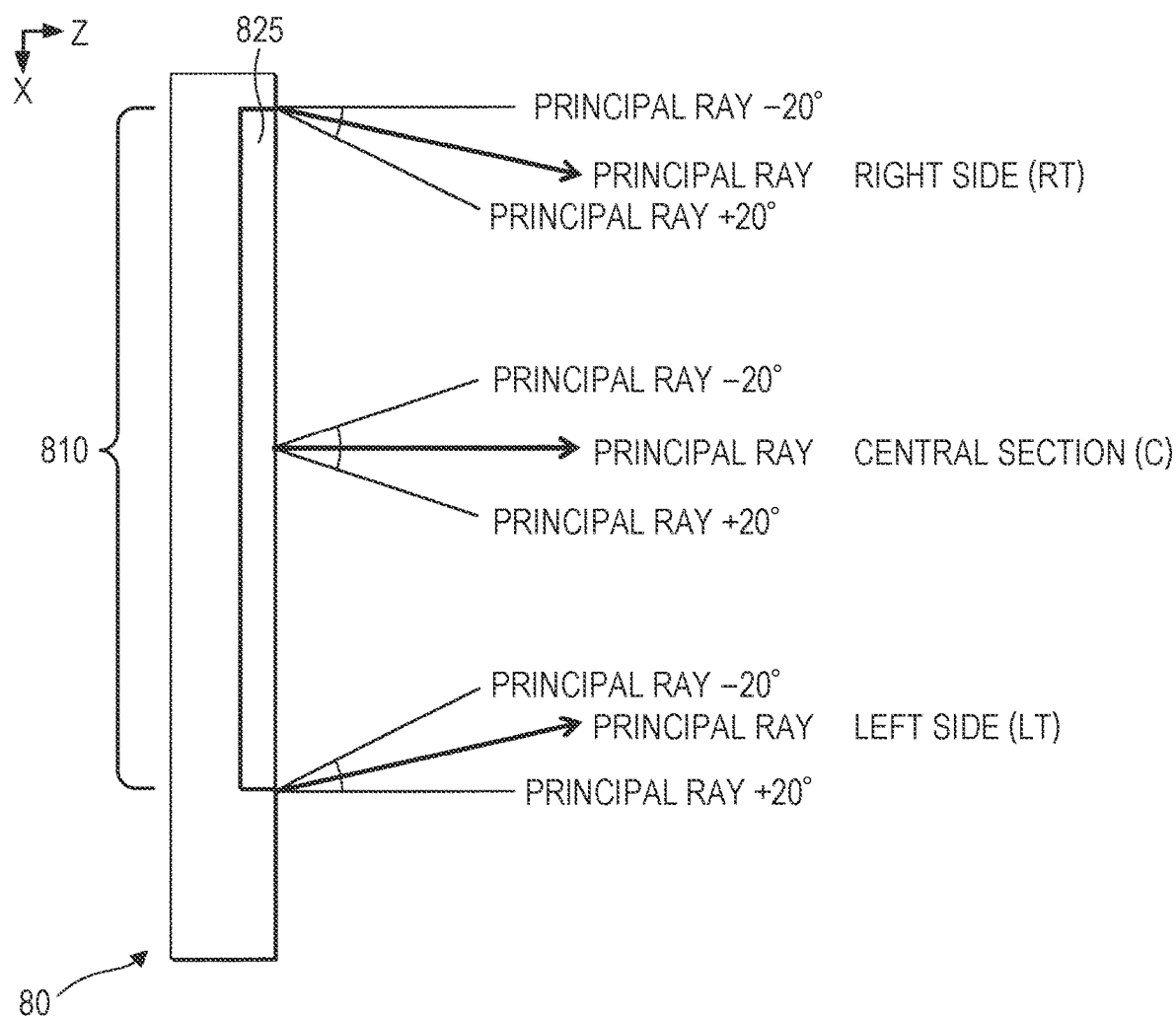
FIG. 7 is a diagram illustrating an angle of inclination of the principal ray in a row direction (X direction) of the display area.

FIG. 6 is a diagram illustrating the angle of inclination of principal ray in the column direction (Y direction) of the display area 810. FIG. 7 is a diagram illustrating the angle of inclination of the principal ray in the row direction (X direction) of the display area 810. As being understood in FIGS. 6 and 7, in the embodiment, configuration is made such that the range of inclination of the principal ray becomes larger in the row direction (X direction) than the column direction (Y direction) of the display area 810 due to characteristics of the optical system. In the embodiment, as illustrated in FIG. 6, in an upper section of the display area 810, the principal ray of the subpixels 825 is inclined against the normal line of the display area 810 by 10° to a side of the central section of the display area 810. In addition, in a lower section of the display area 810, the principal ray of the subpixels 825 is inclined against the normal line of the display area 810 by 10° to the side of the central section of the display area 810. In a central section of the display area 810, the principal ray of the subpixel 825 goes along the normal line of the display area 810. In each position of the display area 810, light irradiated from the subpixel 825 has a spread of ±10° against the principal ray. Meanwhile, in FIG. 6, it is assumed that a side of the upper section of the display area 810 is a plus angle side and a side of the lower section of the display area 810 is a minus angle side. That is, a direction in order that the red color filter 840R, the green color filter 840G, and the blue color filter 840B are arranged in the column direction (Y direction) is the plus direction, and an inverse order direction thereof is the minus direction.

As illustrated in FIG. 7, on the right side of the display area 810, the principal ray of the subpixels 825 is inclined against the normal line of the display area 810 by 20° to the side of the central section of the display area 810. In addition, on the left side of the display area 810, the principal ray of the subpixels 825 is inclined against the normal line of the display area 810 by 20° to the side of the central section of the display area 810. In the central section of the display area 810, the principal ray of the subpixels 825 goes along the normal line of the display area 810. In each of the positions of the display area 810, light irradiated from the subpixel 825 has a spread of ±20° against the principal ray. Meanwhile, in FIG. 7, it is assumed that the left side of the display area 810 is the plus angle side and the right side of the display area 810 is the minus angle side.

In the head-mounted display 100, in order to visually recognize an excellent image, it is important to secure regular or higher brightness for, particularly, the horizontal direction (in the drawing, the X direction, the row direction), which is a lateral direction in which the eyes EY are arranged, in a certain degree of angle range. The lateral direction is a direction in which eyes move well, compared to the vertical direction (in the drawing, the Y direction and the column direction) which is perpendicular to the lateral direction. In addition, in a case in which binocular vision is possible, pupil distances are different to individual in the lateral direction, thereby requiring a certain degree of margin. Here, in the embodiment, configuration is made such that the range of inclination of the principal ray becomes larger in the row direction (X direction) than the column direction (Y direction) of the display area 810.

In addition, in the embodiment, as illustrated in FIG. 4, the respective color filters 840 are provided to be extended in the row direction (X direction) for respective pixel 820, and the color filters 840 of the same color are disposed to be arranged in the row direction (X direction). In addition, in the column direction (Y direction), the red color filter 840R, the green color filter 840G, and the blue color filter 840B are disposed to be repeatedly arranged in this order.

In the embodiment, as described above, the range of inclination of the principal ray becomes larger in the row direction (X direction) than the column direction (Y direction), and thus the color filters 840 of the same color are disposed to be arranged in the row direction (X direction). Even though an optical axis of the principal ray of the light emitting element 830 of the subpixel 825, which is positioned on the outer side in the row direction (X direction) from the center of the display area 810 in the row direction (X direction), is largely inclined to the central side of the display area 810, the color filters 840 of the same color are disposed to be arranged in the row direction (X direction). Therefore, in the row direction (X direction), light, irradiated from the subpixel 825 which includes a color filter 840 of a certain color, is not influenced by a color filter 840 of another color. As a result, according to an angle in which the electro-optical device 80 is viewed, the change in brightness and chromaticity hardly occurs. As described above, in the embodiment, the color filters 840 are provided to be extended in the row direction (X direction) in which the range of inclination of the principal ray becomes larger, and the color filters 840 of the same color are disposed to be arranged in the row direction (X direction). As a result, it is possible to improve viewing angle characteristics in the row direction (X direction).

Figure 8:
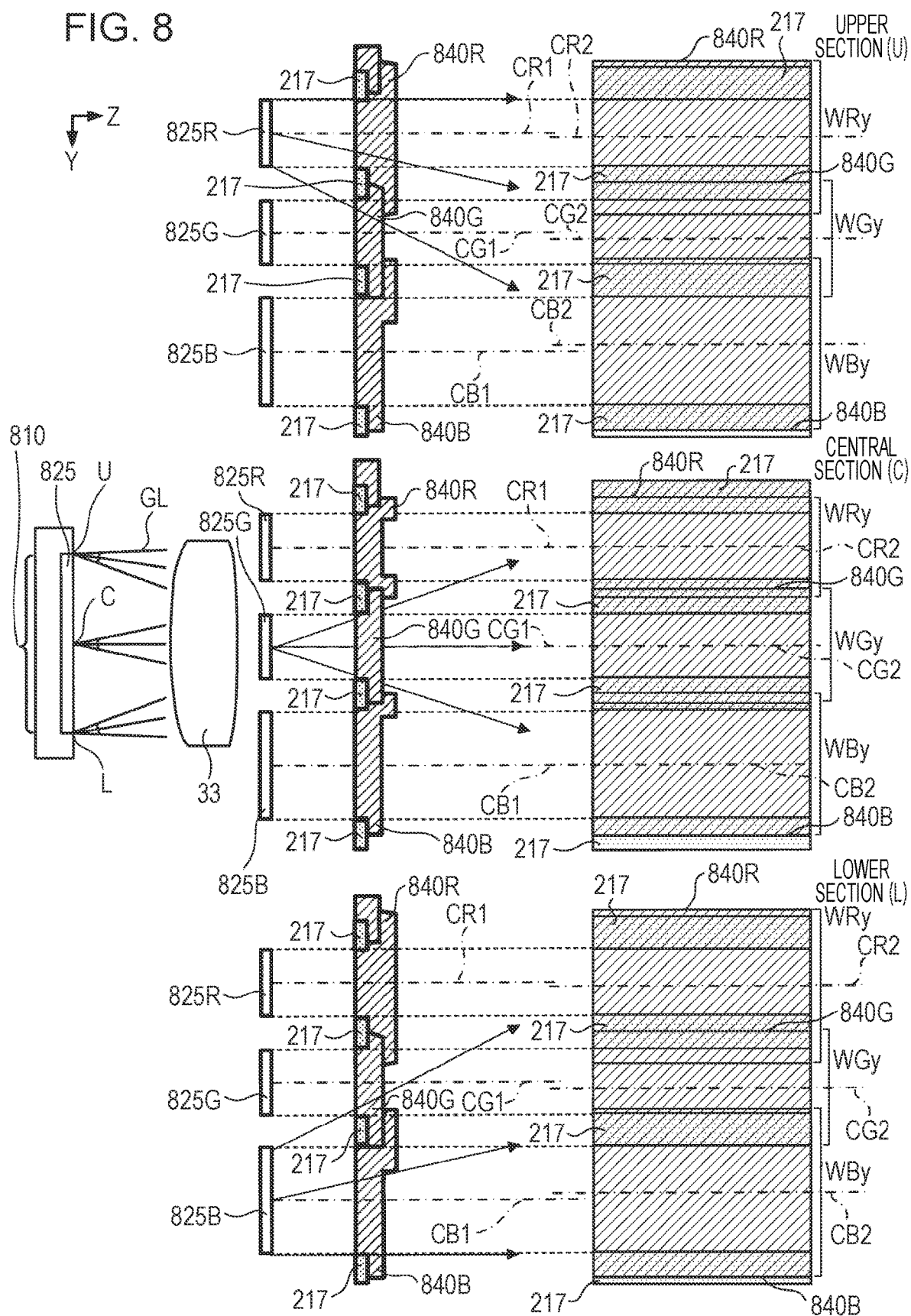
FIG. 8 is a diagram illustrating a positional relationship between each subpixel and each color filter in the column direction (Y direction) of the display area.
Figure 9:
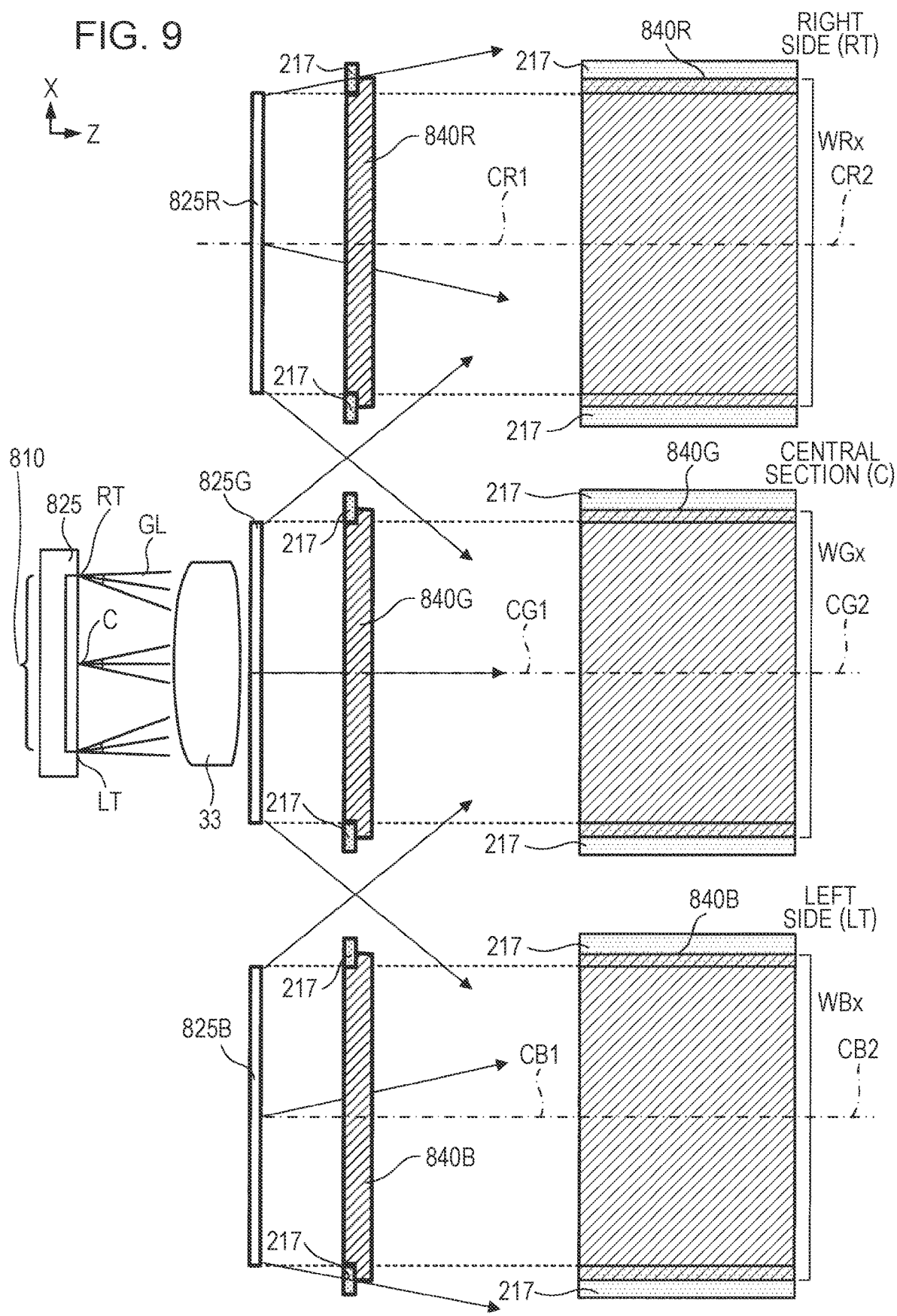
FIG. 9 is a diagram illustrating the positional relationship between red subpixel and red color filter in the row direction (X direction) of the display area.

Subsequently, a positional relationship between each subpixel 825 and each color filter 840 will be described. FIG. 8 is a diagram illustrating the positional relationship between each subpixel 825 and each color filter 840 in the column direction (Y direction) of the display area 810. FIG. 9 is a diagram illustrating a positional relationship between the red subpixel 825 and the red color filter 840R in the row direction (X direction) of the display area 810.

As illustrated in FIG. 8, in the column direction (Y direction) of the display area 810, a central position of the color filter 840 in the upper section (U) of the display area 810 is deviated from the central position of each subpixel 825. In addition, in the central position of the color filter 840 in the lower section (L) of the display area 810, the central position of the color filter 840 is deviated from the central position of the each subpixel 825. The central position of the color filter 840 in the central section (C) of the display area 810 coincides with the central position of each subpixel 825.

In the upper section (U) of the display area 810, a central position CR2 of the red color filter 840R in the column direction (Y direction) is deviated from a central position CR1 of the red subpixel 825R in the column direction (Y direction) to the side of the central section of the display area 810. A width WRy of the red color filter 840R in the column direction (Y direction) overlaps with a width of the color filter 840 of another color, which is adjacent in the column direction (Y direction), in a plan view. A central position CG2 of the green color filter 840G in the column direction (Y direction) is deviated from the central position CG1 of the green subpixel 825G in the column direction (Y direction) to the side of the central section of the display area 810. A width WGy of the green color filter 840G in the column direction (Y direction) overlaps with a width of a color filter 840 of another color, which is adjacent in the column direction (Y direction) in a plan view. A central position CB2 of the blue color filter 840B in the column direction (Y direction) is deviated from the central position CB1 of the blue subpixel 825B in the column direction (Y direction) to a side separated from the central section of the display area 810. A width WBy of the blue color filter 840B in the column direction (Y direction) overlaps with a width of a color filter 840 of another color, which is adjacent in the column direction (Y direction), in a plan view.

In the central section (C) of the display area 810, the central position CR2 of the red color filter 840R in the column direction (Y direction) coincides with the central position CR1 of the red subpixel 825R in the column direction (Y direction). The central position CG2 of the green color filter 840G in the column direction (Y direction) coincides with the central position CG1 of the green subpixel 825G in the column direction (Y direction). The central position CB2 of the blue color filter 840B in the column direction (Y direction) coincides with the central position CB1 of the blue subpixel 825B in the column direction (Y direction).

In the lower section (L) of the display area 810, the central position CR2 of the red color filter 840R in the column direction (Y direction) is deviated from the central position CR1 of the red subpixel 825R in the column direction (Y direction) to a side which is separated from the central section of the display area 810. The width WRy of the red color filter 840R in the column direction (Y direction) overlaps with the width of the color filter 840 of another color, which is adjacent in the column direction (Y direction), in a plan view. The central position CG2 of the green color filter 840G in the column direction (Y direction) is deviated from the central position CG1 of the green subpixel 825G in the column direction (Y direction) to a side which is separated from the central section of the display area 810. The width WGy of the green color filter 840G in the column direction (Y direction) overlaps with the width of the color filter 840 of another color, which is adjacent in the column direction (Y direction), in a plan view. The central position CB2 of the blue color filter 840B in the column direction (Y direction) is deviated from the central position CB1 of the blue subpixel 825B in the column direction (Y direction) to the side of the central section of the display area 810. The width WBy of the blue color filter 840B in the column direction (Y direction) overlaps with the width of the color filter 840 of another color, which is adjacent in the column direction (Y direction), in a plan view.

In the embodiment, the central position of the subpixel 825 in the column direction (Y direction) and the amount of deviation of the central position of the color filter 840 are different according to the position of the subpixel. In FIG. 8, for simple explanation, the display area 810 is divided into three areas including the upper section (U), the central section (C), and the lower section (L). However, actually, the column direction (Y direction) is divided into further detail areas, and the amount of deviation is set according to the respective areas.

A reason that the amount of deviation between the central position of the subpixel 825 in the column direction (Y direction) and the central position of the color filter 840 is set according to the position of the subpixel is that an angle of inclination of the principal ray is different according to the position of the subpixel. As illustrated in FIG. 8, there is a case where light, which is irradiated from the red subpixel 825R in the upper section (U), not only passes through the red color filter 840R but also passes through the green color filter 840G. In addition, in the embodiment, a bank 217, which separates the red color filter 840R from the green color filter 840G, is formed of a transparent material. Accordingly, there is a case where light irradiated from the red subpixel 825R passes through both the red color filter 840R and the green color filter 840G. A degree, in which light irradiated from a certain subpixel 825 is influenced by an arbitrary color filter 840, changes according to the angle of inclination of the principal ray. Here, in the embodiment, the amount of deviation between the central position of the subpixel 825 in the column direction (Y direction) and the central position of the color filter 840 is adjusted according to the position of the subpixel, thereby preventing change in brightness and chromaticity from occurring due to an angle, in which the electro-optical device 80 is viewed, as much as possible. That is, in the embodiment, in a case where the amount of deviation between the central position of the subpixel 825 in the column direction (Y direction) and the central position of the color filter 840 is adjusted, it is possible to adjust influence on the color filters of the respective colors according to the inclined ray, and thus it is possible to improve the viewing angle characteristic. Meanwhile, the amount of deviation between the central position of the subpixel 825 and the central position of the color filter 840 changes according to a width of overlap between the color filters 840. The width of overlap between the color filters 840 will be described later.

As illustrated in FIG. 9, in the row direction (X direction) of the display area 810, the central position of the red color filter 840R coincides with the central position of the red subpixel 825R in each of the right side (RT), the central section (C), and the left side (LT) of the display area 810. Meanwhile, although FIG. 9 illustrates the positional relationship between red subpixel 825R and the red color filter 840R, a central position of a subpixel 825 of another color coincides with a central position of a color filter 840 of another color. The reason for this is that the color filters 840 of the same color are disposed to be arranged in the row direction (X direction). With the configuration, although an optical axis of the light emitting element 830 of the subpixel 825, which is positioned on the outer side in the row direction (X direction) from the center of the display area 810, is largely inclined, the inclined ray is not influenced by a color filter 840 of another color, and thus it is possible to improve the viewing angle characteristics.

Figure 10:
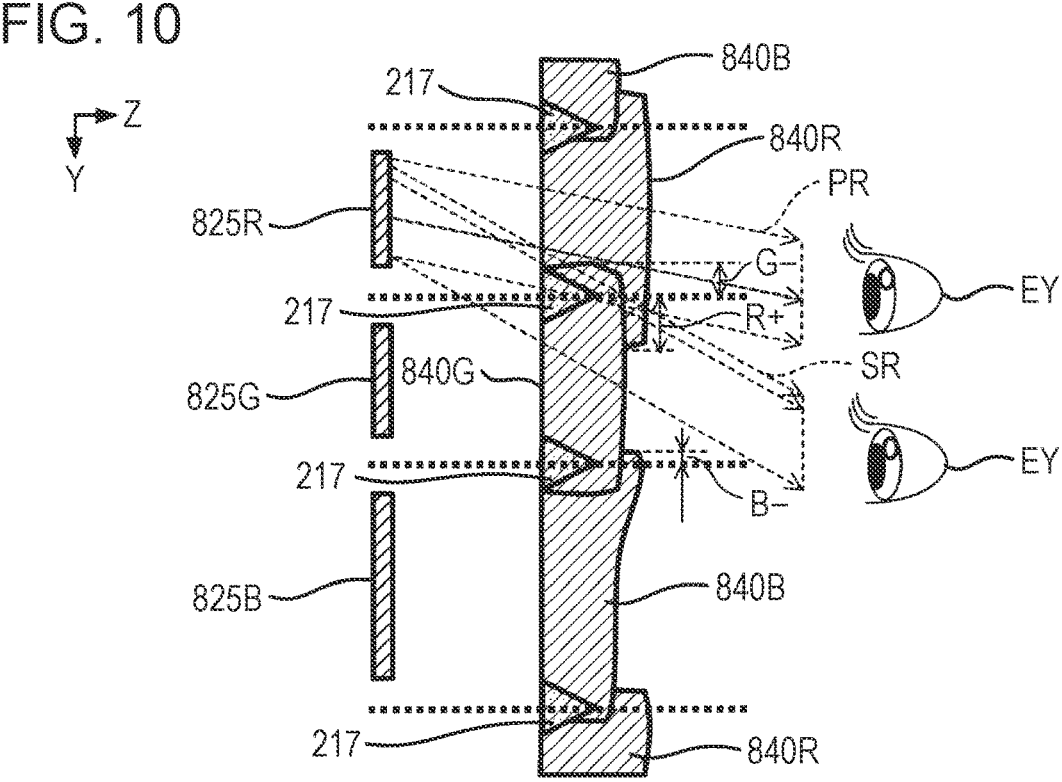
FIG. 10 is a diagram illustrating an overlap between color filters according to a comparative example.
Figure 11:
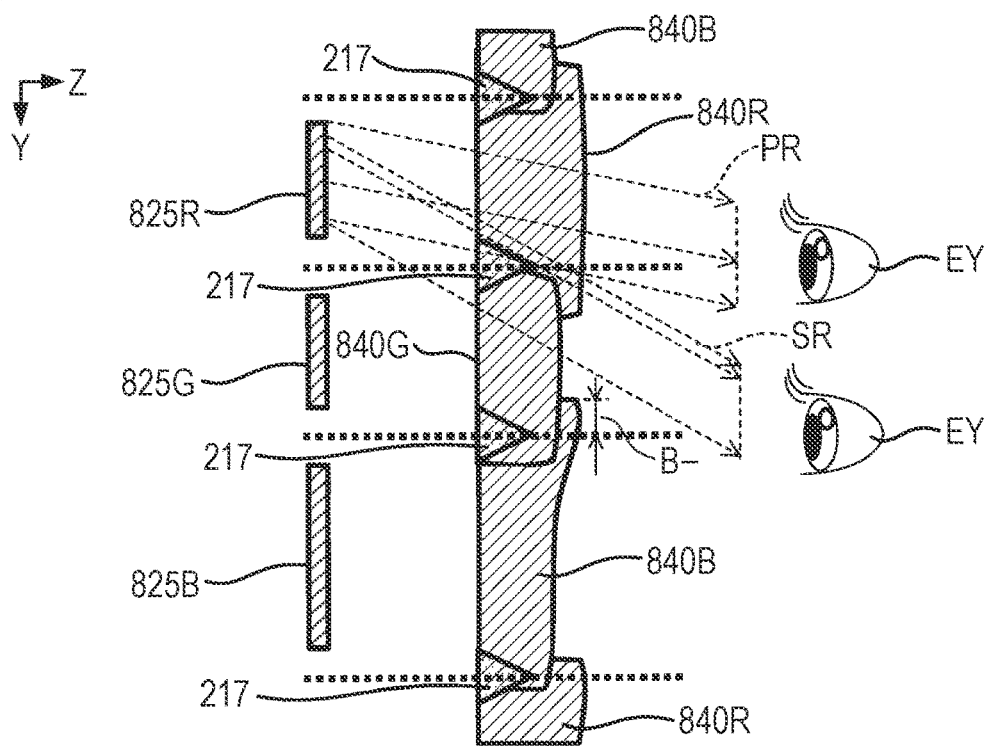
FIG. 11 is a diagram illustrating the overlap between the color filters according to the embodiment.

Subsequently, the width of overlap between the color filters 840 according to the embodiment will be described. FIG. 10 is a diagram illustrating an overlap of the color filters according to a comparative example. FIG. 11 is a diagram illustrating an overlap of the color filters according to the embodiment. FIGS. 10 and 11 illustrate a sectional surface of the color filter in the column direction (Y direction) in the upper section (U) of the display area 810 illustrated in FIG. 8.

As illustrated in FIG. 10, in the upper section (U) of the display area 810, a principal ray PR of the subpixel 825 is inclined to a side of the central section of the display area 810 (central section). Accordingly, in a case where a position of the eye EY is a position which faces the principal ray PR, light irradiated from the red subpixel 825R passes through the red color filter 840R. In addition, light irradiated from the red subpixel 825R passes through an overlap part in which the red color filter 840R and the green color filter 840G overlap with each other. However, in a case where the position of the eye EY is a position which faces a sub ray SR inclined by, for example, 10° from the principal ray PR, a part of the light irradiated from the red subpixel 825R passes through a part where the red color filter 840R and the green color filter 840G overlap with each other. However, almost the light irradiated from the red subpixel 825R passes through the green color filter 840G. Particularly, in a case where the bank 217 is formed of a transparent material, the light irradiated from the red subpixel 825R passes through the bank 217, and passes through the green color filter 840G. Therefore, in this case, light which should be originally removed as the red color is shifted to a green color side.

In addition, as described above, in a case where the resonant wavelength of emitted light is set according to the optical path length between the reflection layer and the common electrode and the sub ray SR is inclined against the normal line of the subpixel 825R as illustrated in FIG. 10, the optical path length inside the subpixel 825R becomes longer than a ray along the normal line. As a result, light irradiated from the subpixel 825R is shifted to a short-wavelength side rather than the original red color.

Figure 14:
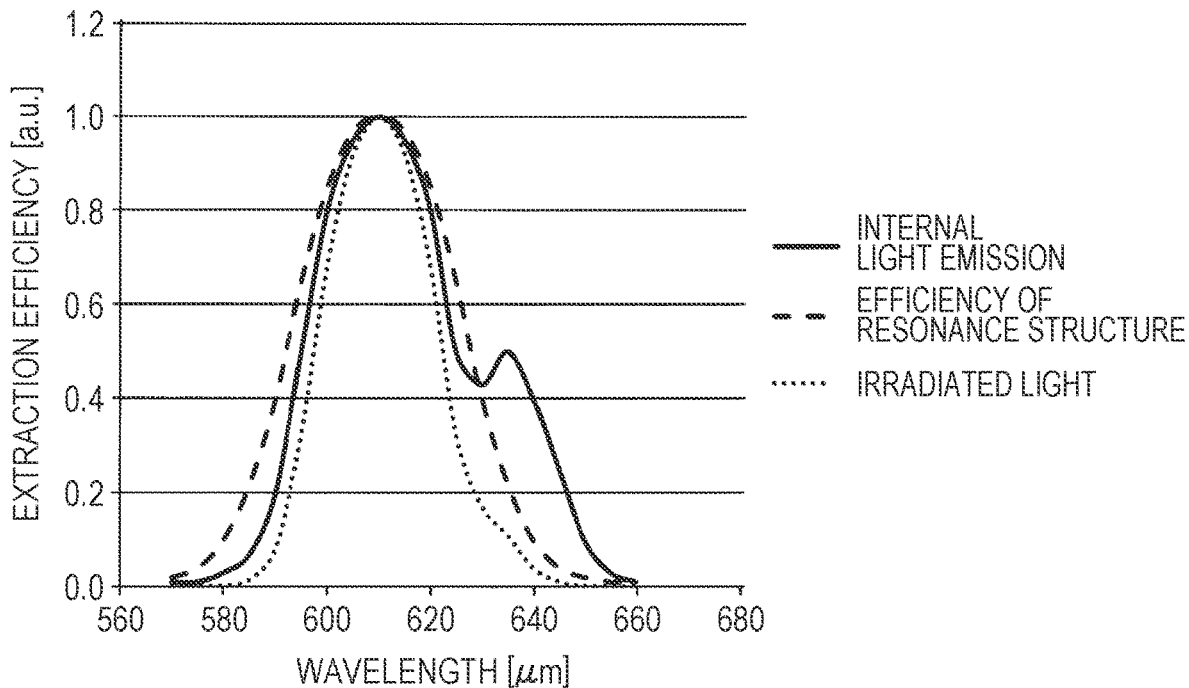
FIG. 14 is a graph illustrating a relationship between a spectrum of internally-emitting light of a light emitting element in a red subpixel, efficiency for each wavelength according to a resonance structure, and a spectrum of light which is finally irradiated from the red subpixel after the internally-emitting light is influenced by the resonance structure.

FIG. 14 illustrates a relationship between a spectrum of internally-emitting light of the light emitting element 830 in the red subpixel 825R, efficiency for each wavelength according to the resonance structure, and a spectrum of light which is finally irradiated from the red subpixel 825R after the internally-emitting light is influenced by the resonance structure. As being understood from FIG. 14, red light which has a peak at 600 to 620 nm is acquired according to the resonance structure.

Figure 15:
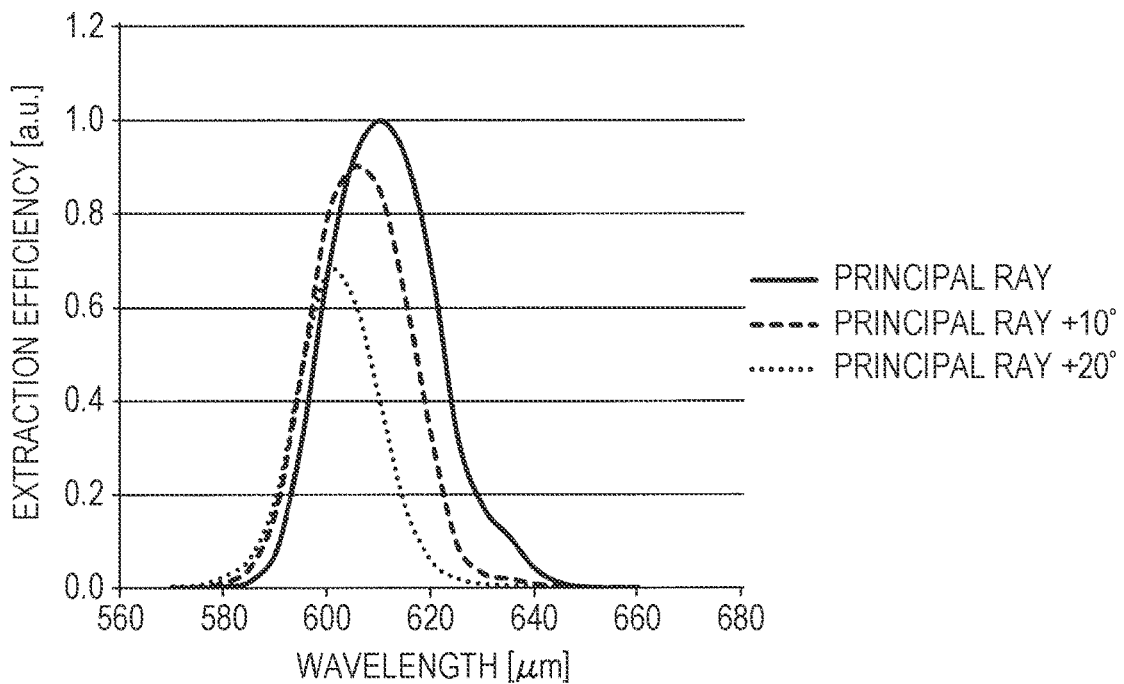
FIG. 15 is a graph illustrating a relationship between a ray, inclination, and a wavelength in the red subpixel.

FIG. 15 is a graph illustrating a relationship between the ray, the inclination, and the wavelength in the red subpixel 825R. FIG. 15 illustrates a spectrum acquired in a case where the ray is in a direction along the normal line, a spectrum acquired in a case where the ray is inclined by 10° to a side of central section of the display area against the normal line, and a spectrum acquired in a case where the ray is inclined by 20° to the side of central section of the display area against the normal line. As being understood from FIG. 15, it is understood that light irradiated from the subpixel 825R is shifted to a side of a short wavelength as the inclination becomes large.

Figure 16:
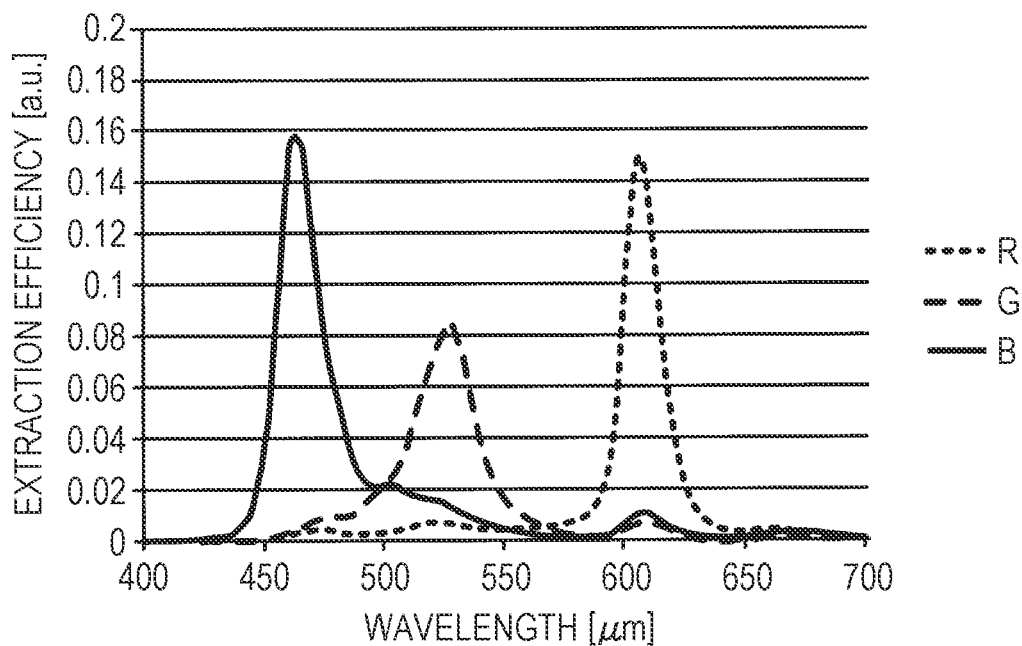
FIG. 16 is a graph illustrating the spectrums of light irradiated from the subpixels of the respective colors.

FIG. 16 is a graph illustrating spectrums of light irradiated from the subpixels 825 of the respective colors. As being understood from FIG. 16, green light which has a peak at 510 to 530 nm is acquired in the green subpixel 825G, and, in addition, blue light which has a peak at 450 to 480 nm is acquired in the blue subpixel 825B.

Figure 17:
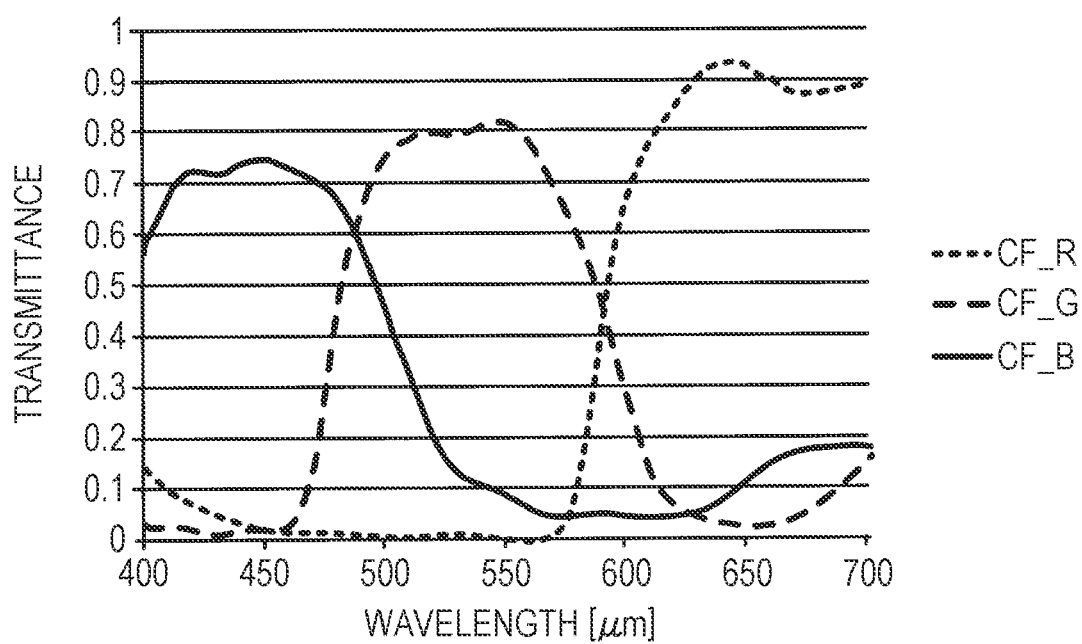
FIG. 17 is a graph illustrating transmittance of the color filters of the respective colors.

FIG. 17 is a graph illustrating transmittance of the color filters 840 of the respective colors. As being understood from FIG. 17, the color filters 840 of the respective colors have properties of causing the peak wavelengths of light of the respective colors, illustrated in FIG. 16, to pass therethrough at high transmittance.

Figure 18:
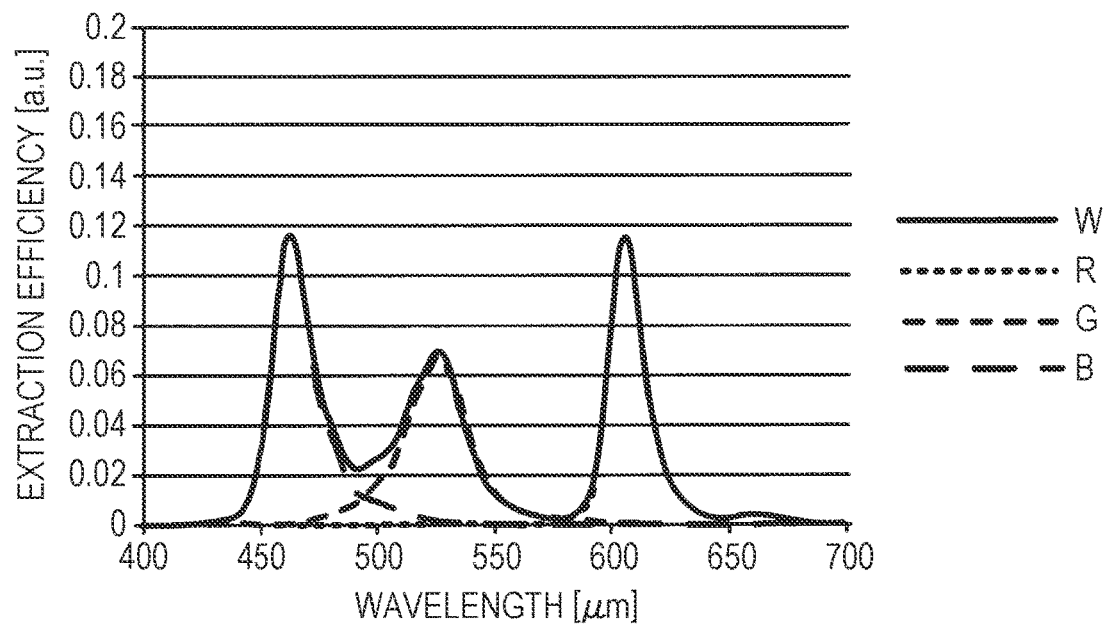
FIG. 18 is a graph illustrating the spectrums of light irradiated from the respective subpixels and the spectrum of light irradiated from an overall pixel.

FIG. 18 is a graph illustrating the spectrums of light irradiated from the respective subpixels and a spectrum of light irradiated from an overall pixel 820. As being understood from FIG. 18, in a case where wavelengths at appropriate peaks are acquired in the respective subpixels as illustrated in FIG. 16 and the color filters of the respective colors are used as illustrated in FIG. 17, the red light, the green light, and the blue light are appropriately mixed, and thus appropriate white light is acquired.

Therefore, it is understood that, in a case where the principal ray and the sub ray are inclined against the normal line of the subpixel as illustrated in FIG. 10, light irradiated in each of the subpixels is shifted and thus appropriate white light is not acquired.

A shift of irradiated light in the upper section (U), the central section (C), and the lower section (L) of the display area 810 in the comparative example illustrated in FIG. 10 will be described with reference to FIGS. 19 to 24. The comparative example illustrated in FIG. 10 is an example in which the irradiated light is uniformed regardless of the position of the subpixel 825 in the column direction (Y direction) of the display area 810.

Figure 19:
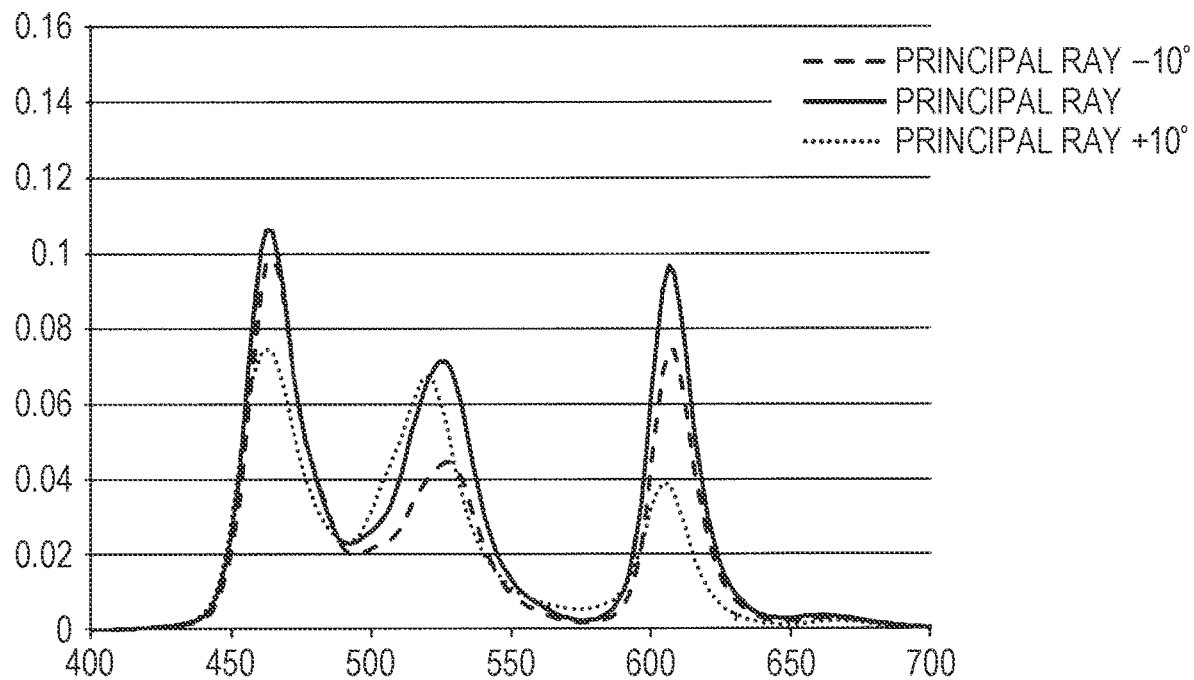
FIG. 19 is a graph comparing the spectrums of the principal ray, light which is inclined from the principal ray by −10°, and light which is inclined from the principal ray by +10° in an upper section of the display area according to the comparative example.
Figure 20:
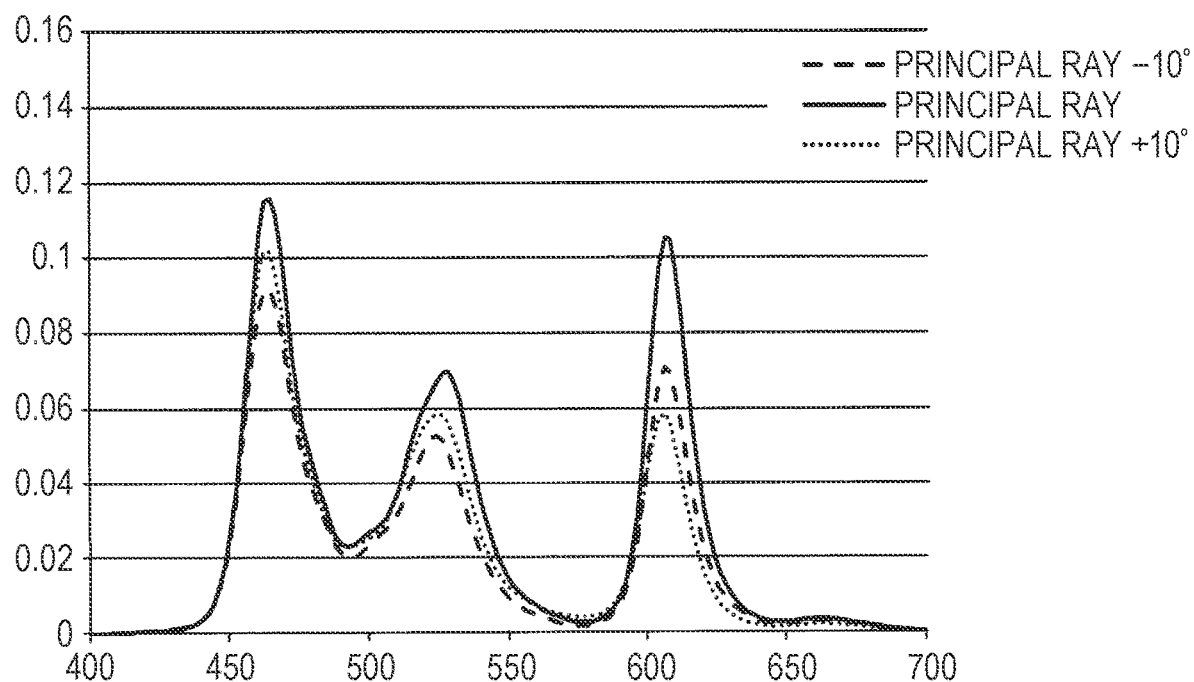
FIG. 20 is a graph comparing the spectrums of the principal ray, the light which is inclined from the principal ray by −10°, and the light which is inclined from the principal ray by +10° in a central section of the display area according to the comparative example.
Figure 21:
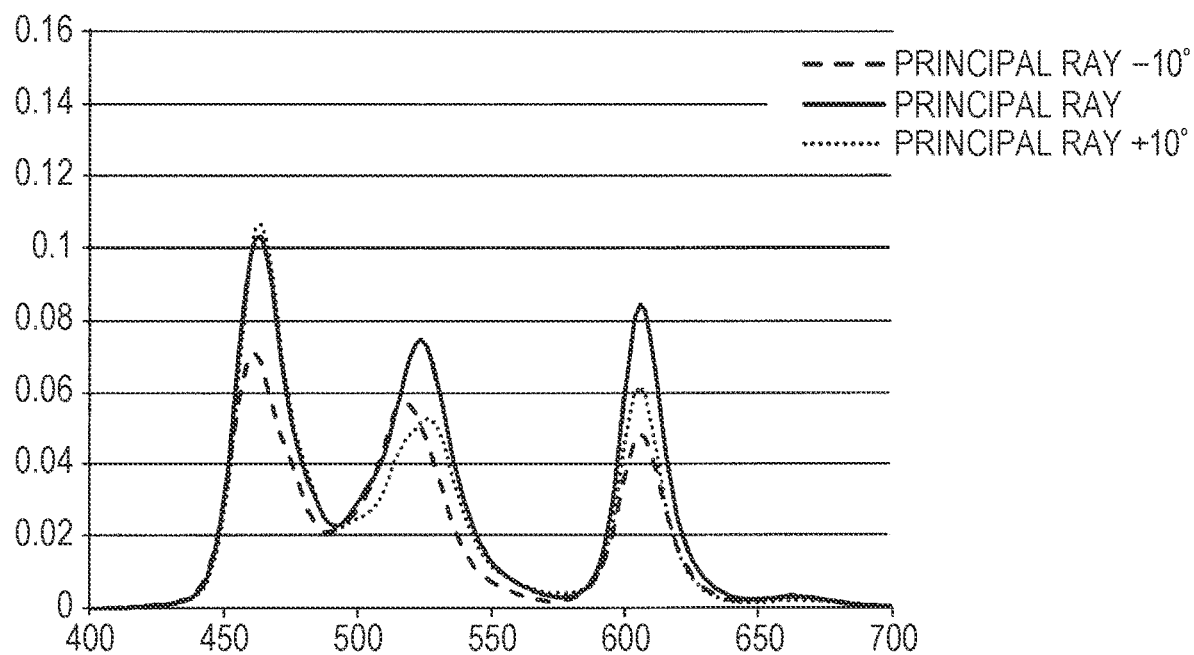
FIG. 21 is a graph comparing the spectrums of the principal ray, the light which is inclined from the principal ray by −10°, and the light which is inclined from the principal ray by +10° in a lower section of the display area according to the comparative example.
Figure 22:
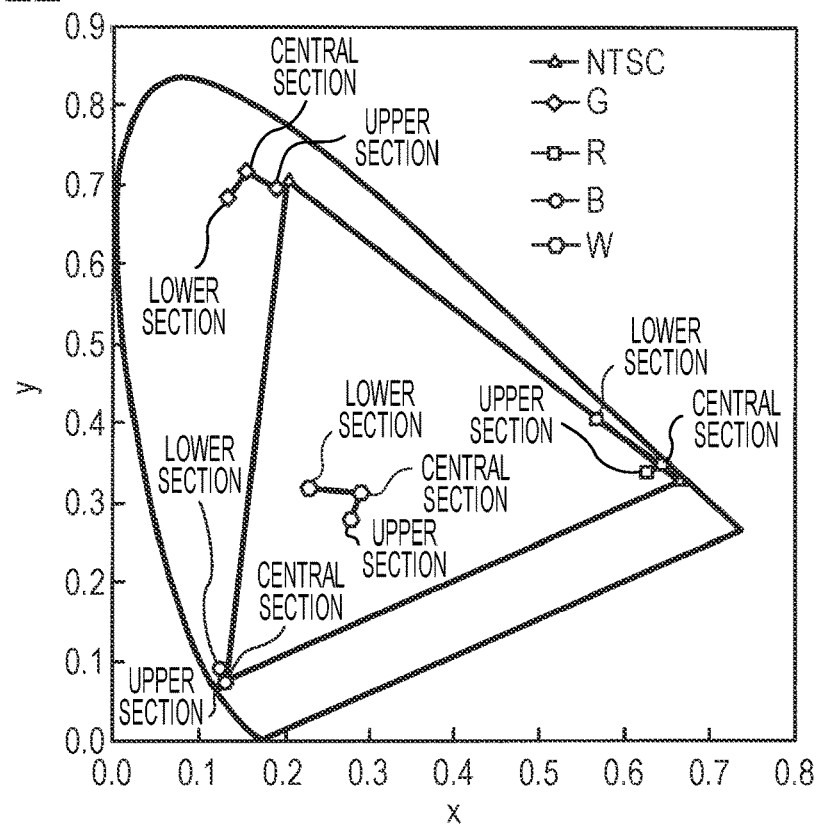
FIG. 22 is a chromaticity diagram illustrating chromaticity of the principal ray, the light which is inclined from the principal ray by −10°, and the light which is inclined from the principal ray by +10° in the upper section of the display area according to the comparative example.
Figure 23:
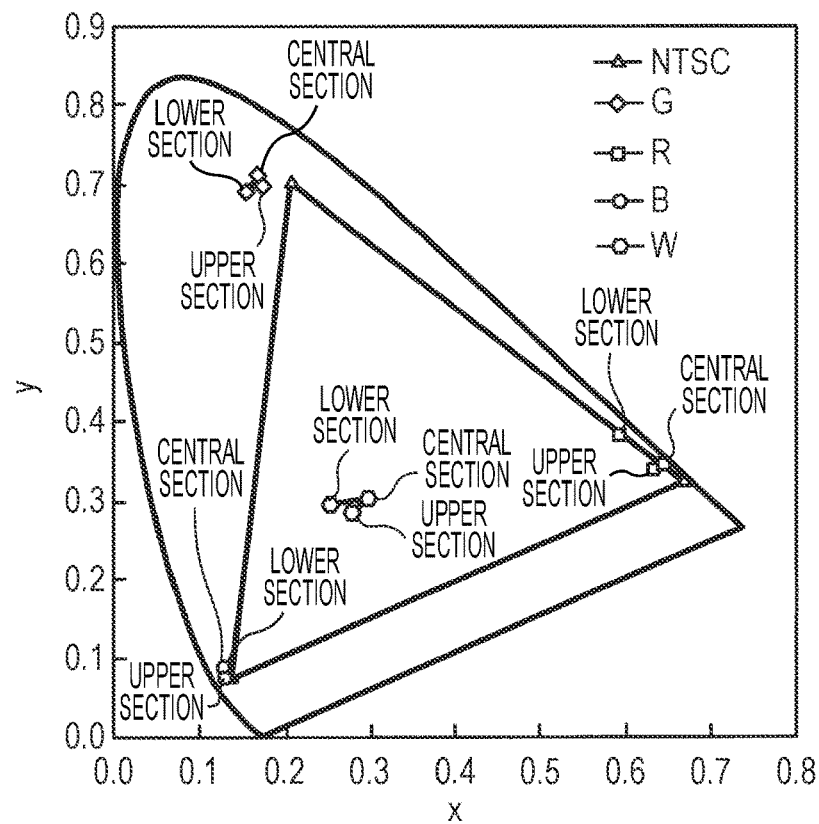
FIG. 23 is a chromaticity diagram illustrating the chromaticity of the principal ray, the light which is inclined from the principal ray by −10°, and the light which is inclined from the principal ray by +10° in the central section of the display area according to the comparative example.
Figure 24:
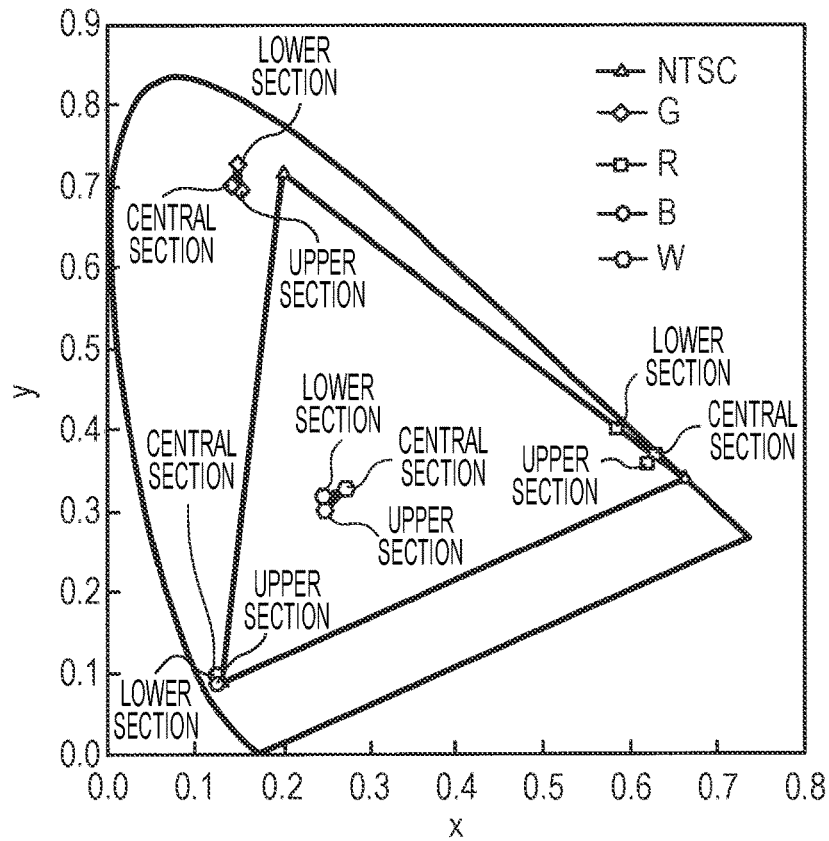
FIG. 24 is a chromaticity diagram illustrating the chromaticity of the principal ray, the light which is inclined from the principal ray by −10°, and the light which is inclined from the principal ray by +10° in the lower section of the display area according to the comparative example.

FIG. 19 is a graph comparing spectrums of a principal ray in the upper section (U) of the display area 810, the light which is inclined from the principal ray by −10°, and the light which is inclined from the principal ray by +10° according to the comparative example. FIG. 20 is a graph comparing spectrums of the principal ray in the central section (C) of the display area 810, the light which is inclined from the principal ray by −10°, and the light which is inclined from the principal ray by +10° according to the comparative example. FIG. 21 is a graph comparing spectrums of the principal ray in the lower section (L) of the display area 810, the light which is inclined from the principal ray by −10°, and the light which is inclined from the principal ray by +10° according to the comparative example. FIG. 22 is a chromaticity diagram illustrating chromaticity of the principal ray, the light which is inclined from the principal ray by −10°, and the light which is inclined from the principal ray by +10° in the upper section (U) of the display area 810 according to the comparative example. FIG. 23 is a chromaticity diagram illustrating chromaticity of the principal ray, the light which is inclined from the principal ray by −10°, and the light which is inclined from the principal ray by +10° in the central section (C) of the display area 810 according to the comparative example. FIG. 24 is a chromaticity diagram illustrating chromaticity of the principal ray, the light which is inclined from the principal ray by −10°, and the light which is inclined from the principal ray by +10° in the lower section (L) of the display area 810 according to the comparative example.

As being understood from FIG. 19, the peak wavelength of the irradiated light in each subpixel 825 is appropriate for the principal ray in the upper section (U) of the display area 810. Furthermore, as being understood from FIG. 22, irradiated light from the overall pixel 820 becomes white color.

As being understood from FIG. 19, in a case where the light is inclined by −10° from the principal ray in the upper section (U) of the display area 810, the shift of the peak wavelength of the irradiated light in each subpixel 825 is not large but an extraction efficiency of the irradiated light in the red subpixel 825R is lowered. In addition, an extraction efficiency of the irradiated light in the green subpixel 825G is lowered. However, a degree, in which extraction efficiency of the irradiated light is lowered in the blue subpixel 825B, is small. As a result, as being understood from FIG. 22, irradiated light of the overall pixel 820 has reduced red color components and green color components, and is slightly shifted to a violet color side.

As being understood from FIG. 19, in a case where the light is inclined by +10° from the principal ray in the upper section (U) of the display area 810, the peak wavelength of the irradiated light in the green subpixel 825G is shifted to a short wavelength side. In addition, the extraction efficiency of the irradiated light is lowered in the red subpixel 825R and the blue subpixel 825B. As a result, as being understood from FIG. 22, the irradiated light of the overall pixel 820 has reduced red color components and is shifted to a blue color side.

As being understood from FIG. 20, the peak wavelength of the irradiated light in each subpixel 825 is appropriate for the principal ray in the central section (C) of the display area 810. Furthermore, as being understood from FIG. 23, the irradiated light of the overall pixel 820 becomes white color.

As being understood from FIG. 20, in a case where the light is inclined by −10° from the principal ray in the central section (C) of the display area 810, the shift of the peak wavelength of the irradiated light in each subpixel 825 is not large but the extraction efficiency of the irradiated light in the red subpixel 825R is lowered. In addition, the extraction efficiency of the irradiated light is slightly lowered in the green subpixel 825G and the blue subpixel 825B. As a result, as being understood from FIG. 23, the irradiated light of the overall pixel 820 has reduced red color components and the green color components, and is slightly shifted to the violet color side.

As being understood from FIG. 20, in a case where the light is inclined by +10° from the principal ray in the central section (C) of the display area 810, the shift of the peak wavelength of the irradiated light in each subpixel 825 is not large. However, the extraction efficiency of the irradiated light in the red subpixel 825R is lowered, compared to a case where the light is inclined by −10° from the principal ray. In addition, the extraction efficiency of the irradiated light in the green subpixel 825G and the blue subpixel 825B increases, compared to the case where the light is inclined by −10° from the principal ray. However, the extraction efficiency is slightly lowered compared to a case where the principal ray is not inclined. As a result, as being understood from FIG. 23, the irradiated light of the overall pixel 820 has reduced red color components and is slightly shifted to the blue color side.

As being understood from FIG. 21, in the lower section (L) of the display area 810, the peak wavelength of the irradiated light in each subpixel 825 is appropriate for the principal ray, and, as being understood from FIG. 22, the irradiated light of the overall pixel 820 becomes the white color.

As being understood from FIG. 21, in a case where the light is inclined by −10° from the principal ray in the lower section (L) of the display area 810, the green subpixel 825G is shifted to the short wavelength side. In addition, the blue subpixel 825B is also slightly shifted to the short wavelength side. In addition, the extraction efficiency is lowered in the overall subpixel 825. As a result, as being understood from FIG. 24, the irradiated light of the overall pixel 820 has reduced red color components, green color components, and the blue color components, and is slightly shifted to the violet color side.

As being understood from FIG. 21, in a case where the light is inclined by +10° from the principal ray in the lower section (L) of the display area 810, the shift of the peak wavelength of the irradiated light in the subpixels 825 of the respective colors is small. However, the extraction efficiency of the irradiated light in the red subpixel 825R and the green subpixel 825G is lowered. As a result, as being understood from FIG. 24, the irradiated light of the overall pixel 820 has reduced red color components and green color components, and is slightly shifted to the blue color side.

As described above, in a case where the width of overlap between the color filters 840 is uniformed regardless of the positions of the subpixels 825 in the column direction (Y direction) of the display area 810, it is understood that the chromaticity of the irradiated light of the overall pixel 820 is shifted from the white color according to a degree of inclination of the principal ray.

Figures 12, 13:
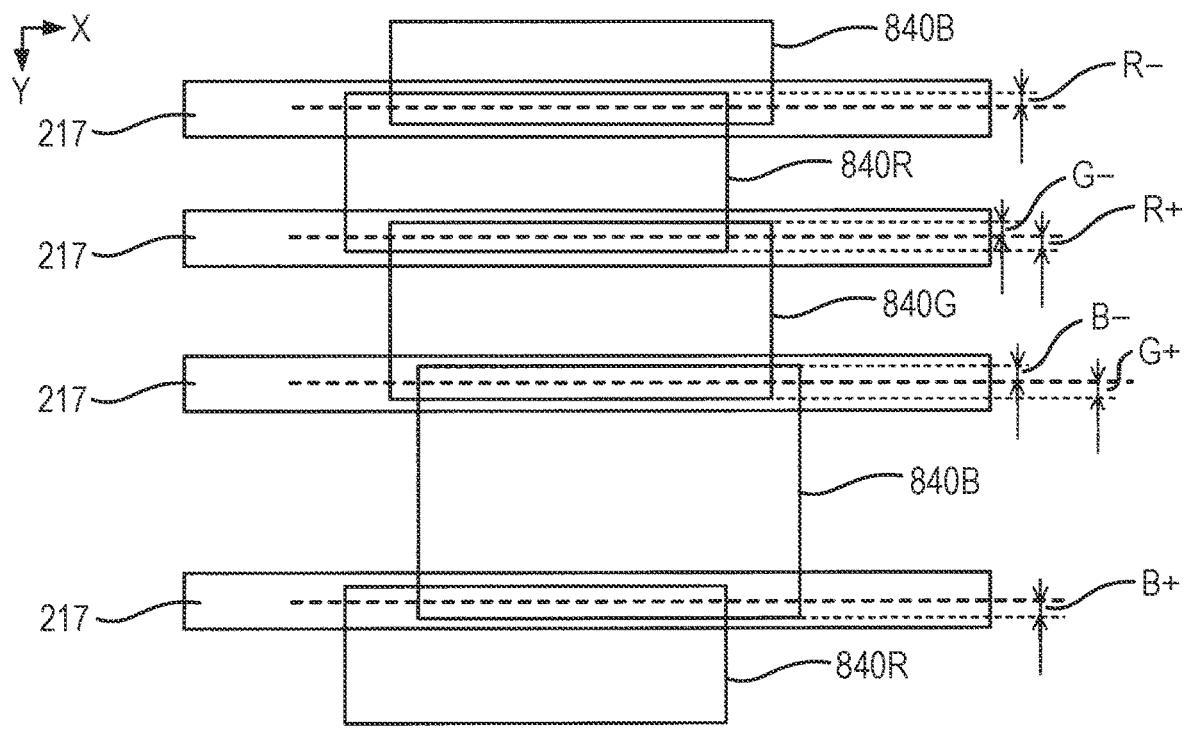
FIG. 12 is a diagram illustrating an example of a width of the overlap between the color filters according to the embodiment.
FIG. 13 is a table illustrating an example of the width of the overlap between the color filters according to the embodiment.

Here, in the embodiment, setting is performed such that the width of overlap between the color filters 840 of the respective colors is different according to the positions of the subpixels 825 in the column direction (Y direction) of the display area 810. FIG. 12 is a view illustrating the width of overlap between the color filters 840 of the respective colors in the embodiment. As illustrated in FIG. 12, the width of overlap is expressed as intervals between end sides, which extend in the row direction (X direction), of the color filters 840 of the respective colors in a plan view and central lines of the banks 217 indicated by dotted lines of FIG. 12. In FIG. 12, a width, in which the red color filter 840R overlaps on the upper side of the column direction (Y direction) rather than the central line of the bank 217, is expressed as a width R− on a minus side. A width, in which the red color filter 840R overlaps on the lower side of the column direction (Y direction) rather than the central line of the bank 217, is expressed as a width R+ on a plus side. A width, in which the green color filter 840G overlaps on the upper side of the column direction (Y direction) rather than the central line of the bank 217, is expressed as a width G− on a minus side. A width, in which the green color filter 840G overlaps on the lower side of the column direction (Y direction) rather than the central line of the bank 217, is expressed as a width G+ on a plus side. A width, in which the blue color filter 840B overlaps on the upper side of the column direction (Y direction) rather than the central line of the bank 217, is expressed as a width B− on a minus side. A width, in which the blue color filter 840B overlaps on the lower side of the column direction (Y direction) rather than the central line of the bank 217, is expressed as a width B+ on a plus side.

Meanwhile, in FIG. 12, for easy understanding, the positions of the respective color filters in the row direction (X direction) are deviated and displayed.

FIG. 13 is a table illustrating an example of the width of overlap between the color filters 840 of the respective colors according to the embodiment. Although FIG. 13 illustrates the width of overlap in representative three spots of the upper section (U), the central section (C), and the lower section (L) in the column direction (Y direction) of the display area 810, actually, the width of overlap is set to a plurality of spots which are further fragmented.

As being understood from FIG. 13, setting is performed such that the width R− of the red color filter 840R on the minus side becomes smaller as the red color filter 840R becomes closer to the lower section (L) than the central section (C). On the side of the lower section (L) rather than the central section (C), the principal ray of each of the subpixels 825 is inclined in the −direction, that is, on the side of the central section (C) in the column direction (Y direction) of the display area 810. As being understood from FIG. 21, in a case where the light is inclined in the −direction from the principal ray on the side of the lower section (L), the extraction efficiency of the blue subpixel 825B is lowered. Here, the width R− of the red color filter 840R, which overlaps the blue color filter 840B on the side of the lower section (L) rather than the central section (C), on the minus side is reduced, thereby increasing an area in which the blue color filter 840B functions.

As being understood from FIG. 13, setting is performed such that width R+ of the red color filter 840R on the plus side becomes larger as being closer to the lower section (L) than the central section (C). As being understood from FIG. 21, in a case where the light is inclined in the −direction from the principal ray on the side of the lower section (L), there is a tendency that the extraction efficiency of the green subpixel 825G is lowered and the extraction efficiency of the red subpixel 825R is further lowered. Here, on the side of the lower section (L) rather than the central section (C), the width R+ of the red color filter 840R, which overlaps the green color filter 840G, on the plus side is increased, thereby increasing an area in which the red color filter 840R functions.

As being understood from FIG. 13, setting is performed such that the width G− of the green color filter 840G on the minus side becomes larger as being closer to the lower section (L) than the central section (C). As being understood from FIG. 21, in a case where the light is inclined from the principal ray in the −direction on the side of the lower section (L), there is a tendency that the extraction efficiency of the green subpixel 825G is lowered. Here, on the side of the lower section (L) rather than the central section (C), the width G− of the green color filter 840G, which overlaps the red color filter 840R, on the minus side is increased, thereby increasing an area in which the green color filter 840G functions.

As being understood from FIG. 13, setting is performed such that the width G+ of the green color filter 840G on the plus side becomes smaller as the green color filter 840G becomes closer to the upper section (U) than the central section (C), or becomes closer to the lower section (L) than the central section (C). As being understood from FIG. 19, in a case where the light is inclined from the principal ray in the +direction on the side of the upper section (U), the extraction efficiency of the red subpixel 825R is remarkably lowered. The phenomenon may be understood from FIG. 10. Here, in the embodiment, the width G+ of the green color filter 840G, which overlaps the red color filter 840R on the side of the upper section (U) rather than the central section (C), on the plus side is reduced, thereby increasing the area in which the red color filter 840R functions. FIG. 11 illustrates an example in which the width G− of the green color filter 840G on the minus side is reduced in the upper section (U). As being understood through comparison between FIGS. 10 and 11, even in the case where the light is inclined from the principal ray in the +direction, the width G− of the green color filter 840G on the minus side is reduced, thereby increasing the area in which the red color filter 840R functions. In addition, as being understood from FIG. 21, in the case where the light is inclined from the principal ray in the − direction on the side of the lower section (L), the extraction efficiency of the blue subpixel 825B is remarkably lowered. Here, in the embodiment, the width R+ of the green color filter 840G, which overlaps the blue color filter 840B on the side of the lower section (L) rather than the central section (C), on the plus side is reduced, thereby increasing the area in which the blue color filter 840B functions.

As being understood from FIG. 13, setting is performed such that the width B− of the blue color filter 840B on the minus side becomes larger as being closer to the upper section (U) than the central section (C). As being understood from FIG. 19, in the case where the light is inclined from the principal ray in the +direction, there is a tendency that the extraction efficiency of the green subpixel 825G is not lowered on the side of the upper section (U) but the extraction efficiency of the blue subpixel 825B is lowered. The phenomenon may be understood from FIG. 10. Here, the width B− of the blue color filter 840B, which overlaps the green color filter 840G on the side of the upper section (U) rather than the central section (C), on the minus side is increased, thereby increasing the area in which the blue color filter 840B functions. FIG. 11 illustrates an example in which the width B− of the blue color filter 840B on the minus side is increased in the upper section (U). As being understood through comparison between FIGS. 10 and 11, even in the case where the light is inclined from the principal ray in the +direction, the width B− of the blue color filter 840B on the minus side is increased, thereby increasing the area in which the blue color filter 840B functions.

As being understood from FIG. 13, setting is performed such that the width B+ of the blue color filter 840B on the plus side becomes smaller as being closer to the lower section (L) than the central section (C). As being understood from FIG. 21, on the side of the lower section (L), in the case where the light is inclined from the principal ray in the −direction, the extraction efficiency of the red subpixel 825R is remarkably lowered. Here, in the embodiment, the width B+ of the blue color filter 840B, which overlaps the red color filter 840R on the side of the lower section (L) rather than the central section (C), on the plus side is reduced, thereby increasing the area in which the red color filter 840R functions.

In the embodiment illustrated in FIGS. 11 and 13, the shift of the irradiated light in the upper section (U) of the display area 810, the central section (C), and the lower section (L) will be described with reference to FIGS. 19 to 30.

Figure 25:
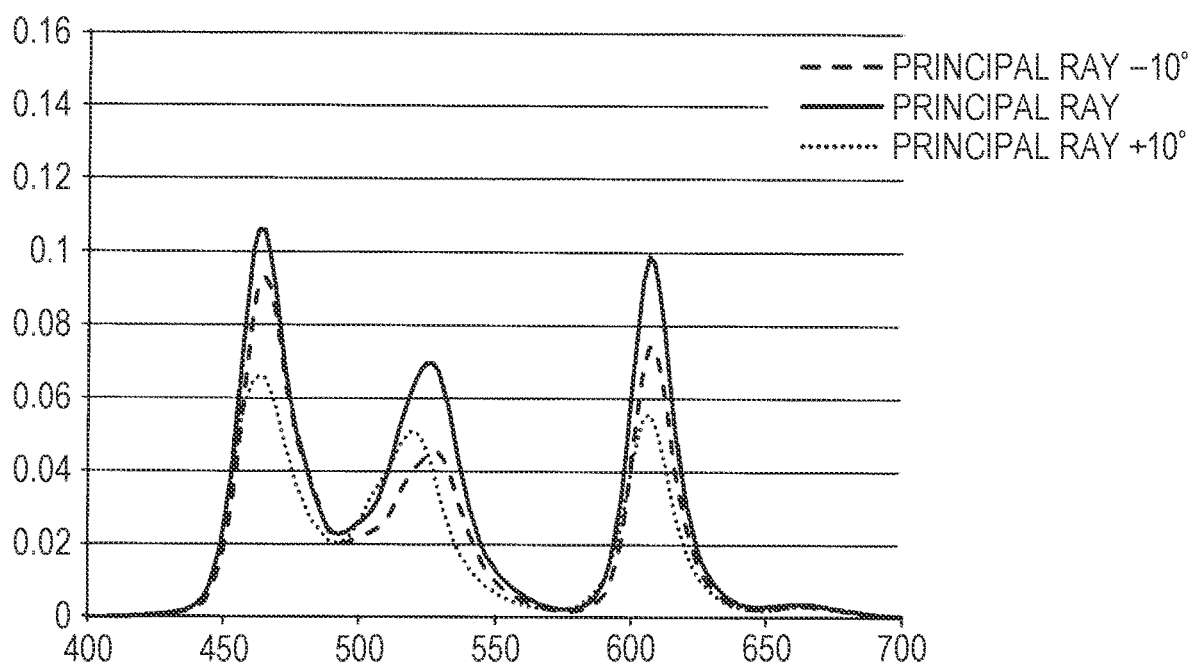
FIG. 25 is a graph comparing the spectrums of the principal ray, the light which is inclined from the principal ray by −10°, and the light which is inclined from the principal ray by +10° in the upper section of the display area according to the embodiment.
Figure 26:
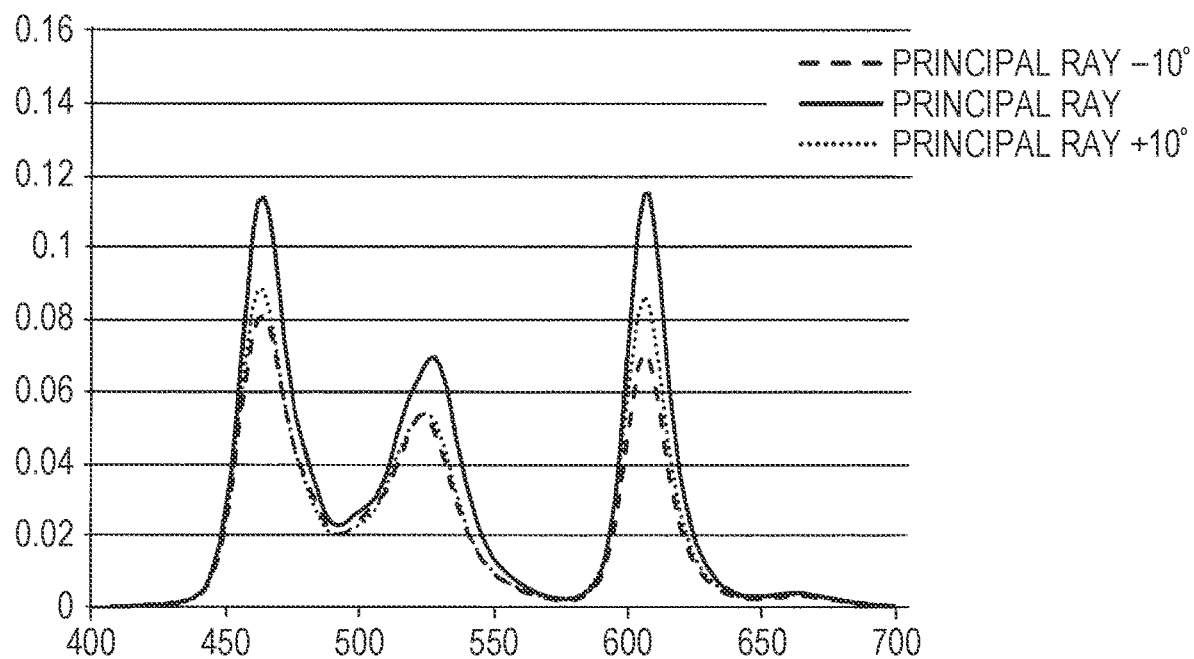
FIG. 26 is a graph comparing the spectrums of the principal ray, the light which is inclined from the principal ray by −10°, and the light which is inclined from the principal ray by +10° in the central section of the display area according to the embodiment.
Figure 27:
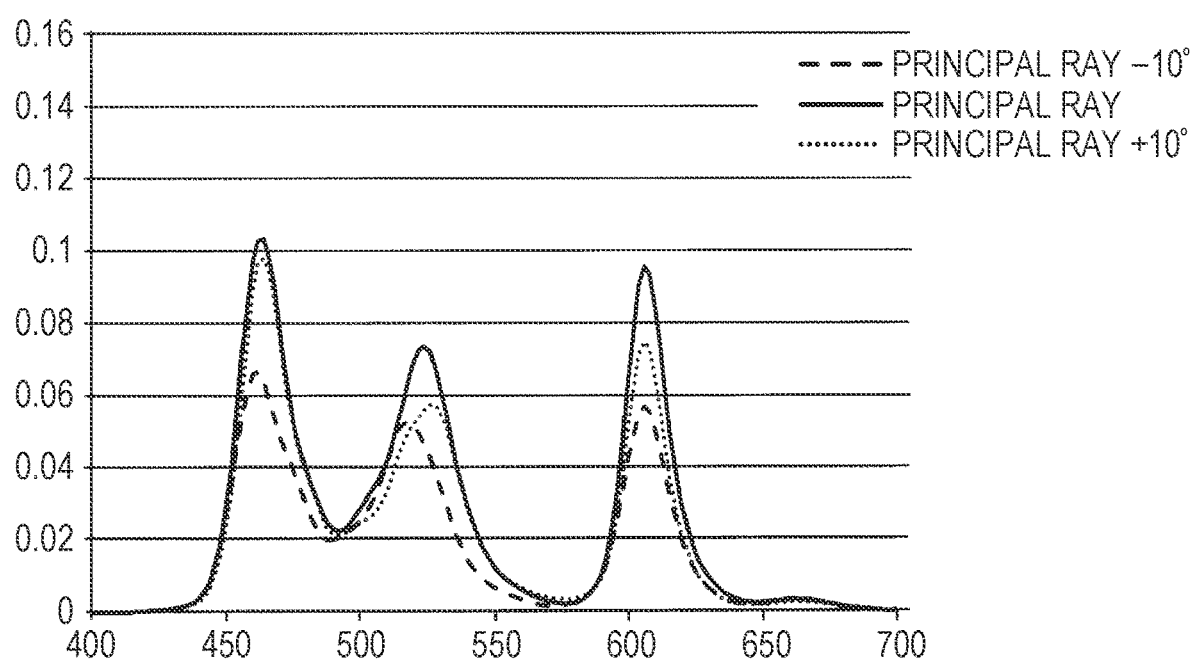
FIG. 27 is a graph comparing the spectrums of the principal ray, the light which is inclined from the principal ray by −10°, and the light which is inclined from the principal ray by +10° in the lower section of the display area according to the embodiment.
Figure 28:
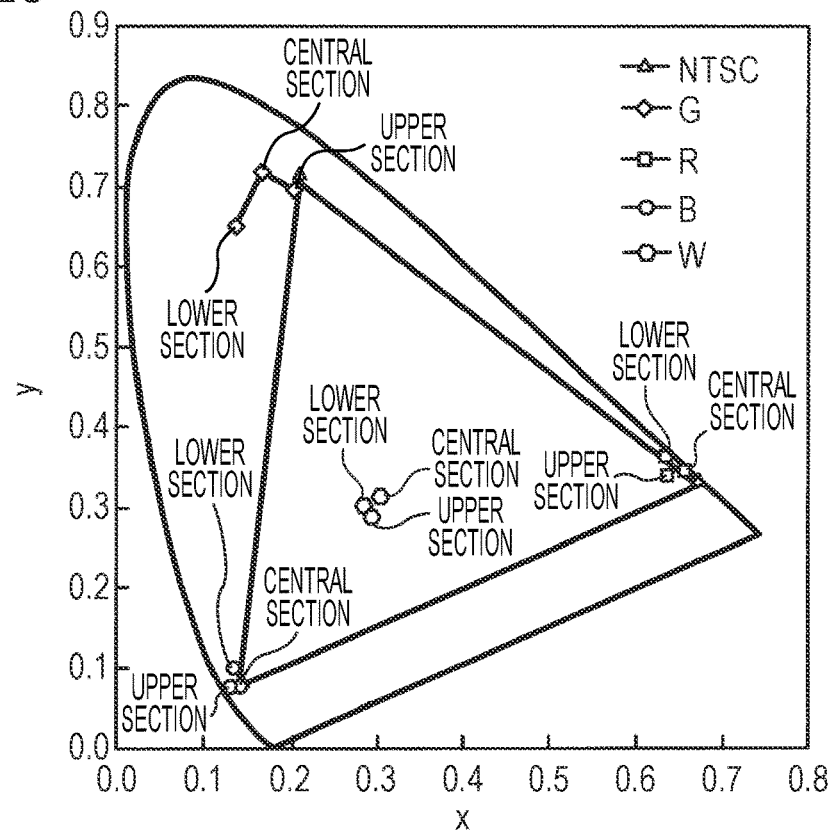
FIG. 28 is a chromaticity diagram illustrating the chromaticity of the principal ray, the light which is inclined from the principal ray by −10°, and the light which is inclined from the principal ray by +10° in the upper section of the display area according to the embodiment.
Figure 29:
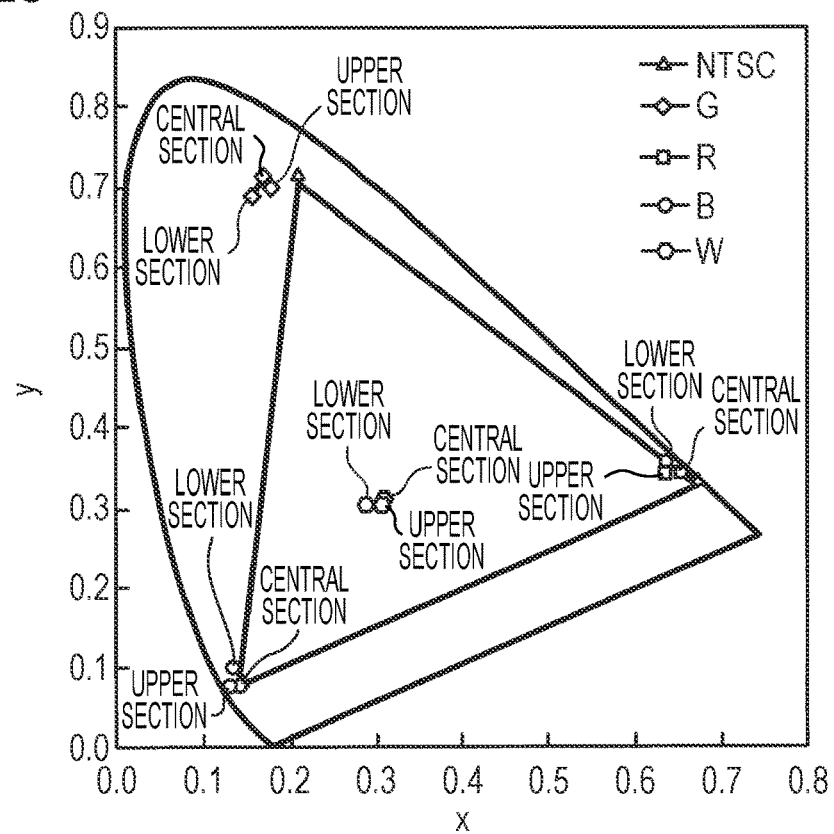
FIG. 29 is a chromaticity diagram illustrating the chromaticity of the principal ray, the light which is inclined from the principal ray by −10°, and the light which is inclined from the principal ray by +10° in the central section of the display area according to the embodiment.
Figure 30:
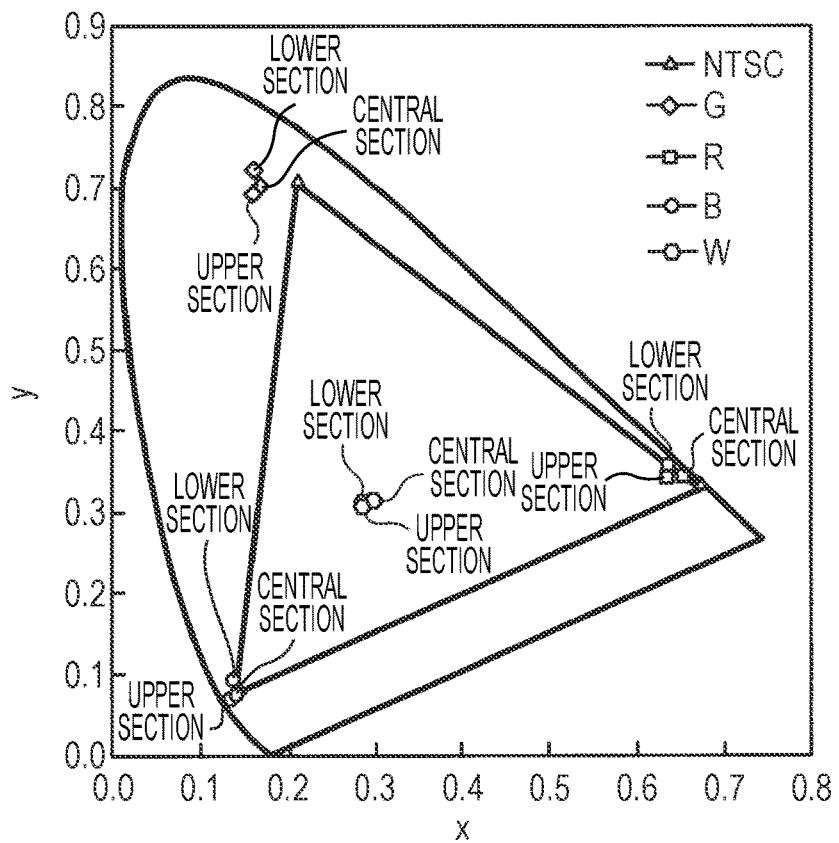
FIG. 30 is a chromaticity diagram illustrating the chromaticity of the principal ray, the light which is inclined from the principal ray by −10°, and the light which is inclined from the principal ray by +10° in the lower section of the display area according to the embodiment.

FIG. 25 is a graph comparing the spectrums of the principal ray in the upper section (U) of the display area 810 according to the embodiment, the light which is inclined from the principal ray by −10°, and the light which is inclined from the principal ray by +10°. FIG. 26 is a graph comparing the spectrums of the principal ray in the central section (C), the light which is inclined from the principal ray by −10°, and the light which is inclined from the principal ray by +10° in the display area 810 according to the embodiment. FIG. 27 is a graph comparing the spectrums of the principal ray, the light which is inclined from the principal ray by −10°, and the light which is inclined from the principal ray by +10° in the lower section (L) of the display area 810 according to the embodiment. FIG. 28 is a chromaticity diagram illustrating chromaticity of the principal ray, the light which is inclined from the principal ray by −10°, and the light which is inclined from the principal ray by +10° in the upper section (U) of the display area 810 according to the embodiment. FIG. 29 is a chromaticity diagram illustrating chromaticity of the principal ray, the light which is inclined from the principal ray by −10°, and the light which is inclined from the principal ray by +10° in the central section (C) of the display area 810 according to the embodiment. FIG. 30 is a chromaticity diagram illustrating chromaticity of the principal ray, the light which is inclined from the principal ray by −10°, and the light which is inclined from the principal ray by +10° in the lower section (L) of the display area 810 according to the embodiment.

As being understood from FIG. 25, in the upper section (U) of the display area 810, the peak wavelength of the irradiated light in each subpixel 825 is appropriate for the principal ray. As being understood from FIG. 28, the irradiated light of the overall pixel 820 becomes white color.

As being understood from comparison of FIG. 25 and FIG. 19 which illustrates the spectrums in the upper section (U) of the display area 810 according to the comparative example, in a case in which the light is inclined from the principal ray by −10°, the extraction efficiency of the irradiated light in the blue subpixel 825B is kept low compared to the comparative example, thereby improving a balance between the subpixels 825 of the respective colors. As a result, as being understood through comparison of FIG. 28 and FIG. 22 according to the comparative example, the amount of shift of white light is reduced in the irradiated light of the overall pixel 820.

As being understood through comparison of FIG. 25 and FIG. 19 according to the comparative example, in a case where the light is inclined from the principal ray by +10°, the amount of shift of the red subpixel 825R and the extraction efficiency of the irradiated light are improved compared to the comparative example. In addition, the amount of shift of the green subpixel 825G and the extraction efficiency of the irradiated light are improved compared to the comparative example. As a result, as being understood through comparison of FIG. 28 and FIG. 22 according to the comparative example, the amount of shift from white light in the irradiated light of the overall pixel 820 is reduced.

As being understood from FIG. 26, in the central section (C) of the display area 810, the peak wavelength of the irradiated light in each subpixel 825 is appropriate for the principal ray. As being understood from FIG. 29, irradiated light of the overall pixel 820 becomes white color.

As being understood through comparison of FIG. 26 and FIG. 20 according to the comparative example, in the case where the light is inclined from the principal ray by −10°, the extraction efficiency of the irradiated light in the blue subpixel 825B is kept low compared to the comparative example, thereby improving a balance between the subpixels 825 of the respective colors. As a result, as being understood through comparison of FIG. 29 and FIG. 23 according to the comparative example, the amount of shift from white light in the irradiated light of the overall pixel 820 is reduced.

As being understood through comparison of FIG. 26 and FIG. 20 according to comparative example, in the case where the light is inclined from the principal ray by +10°, the extraction efficiency of the irradiated light of the red subpixel 825R is improved compared to the comparative example. In addition, the extraction efficiency of the irradiated light of the green subpixel 825G is kept low compared to the comparative example. Furthermore, the extraction efficiency of the irradiated light of the blue subpixel 825B is kept low compared to the comparative example. As a result, a balance between the subpixels 825 of the respective colors is improved. As being understood through comparison of FIG. 29 and FIG. 23 according to the comparative example, the amount of shift from white light in the irradiated light of the overall pixel 820 is reduced.

As being understood from FIG. 27, in the lower section (L) of the display area 810, the peak wavelength of the irradiated light in each subpixel 825 is appropriate for the principal ray. As being understood from FIG. 30, the irradiated light of the overall pixel 820 becomes white color.

As being understood through comparison of FIG. 27 and FIG. 21 according to the comparative example, in the case where the light is inclined from the principal ray by −10°, the extraction efficiency of the irradiated light of the red subpixel 825R is high compared to the comparative example, thereby improving a balance between the subpixels 825 of the respective colors. As a result, as being understood through comparison of FIG. 30 and FIG. 24 according to the comparative example, the amount of shift from white light in the irradiated light of the overall pixel 820 is reduced.

As being understood through comparison of FIG. 27 and FIG. 21 according to the comparative example, in the case the light is inclined from the principal ray by +10°, the extraction efficiencies of the irradiated light of the red subpixel 825R and the green subpixel 825G are high compared to the comparative example. In addition, the extraction efficiency of the irradiated light of the blue subpixel 825B is kept low compared to the comparative example. As a result, a balance between the subpixels 825 of the respective colors is improved. As being understood through comparison of FIG. 30 and FIG. 24 according to the comparative example, the amount of shift from white light in the irradiated light of the overall pixel 820 is reduced.

Figure 31:
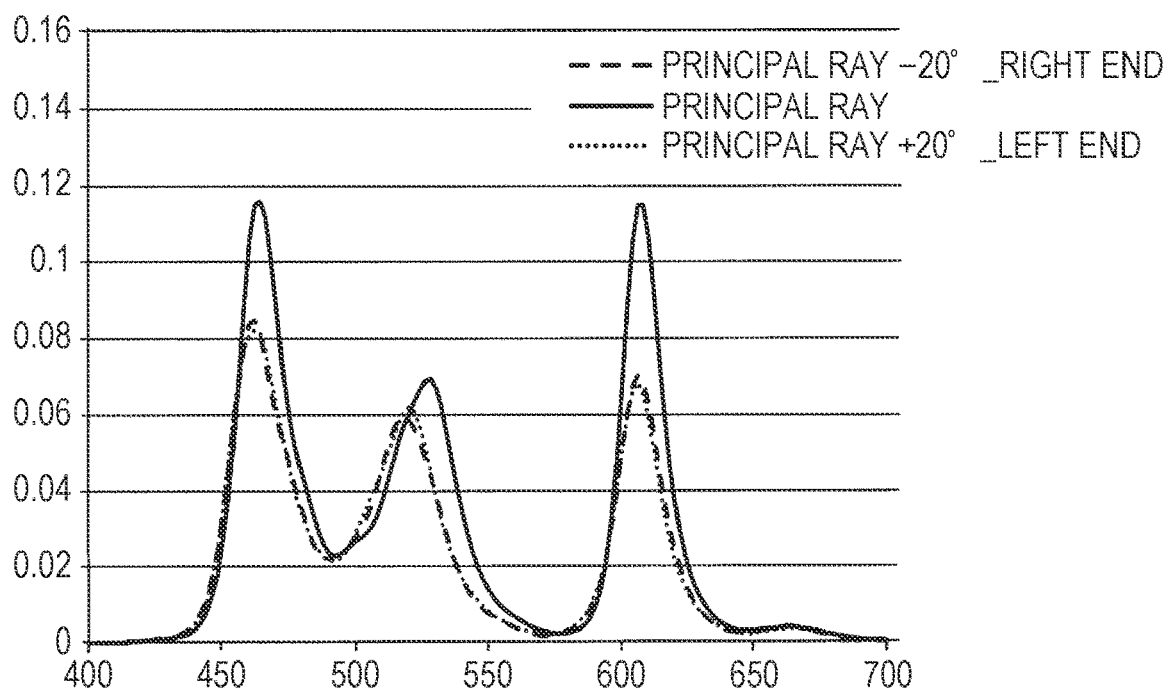
FIG. 31 is a graph comparing the spectrums of the principal ray, the light which is inclined from the principal ray by −20°, and the light which is inclined from the principal ray by +20° in a row direction of the display area according to the embodiment.
Figure 32:
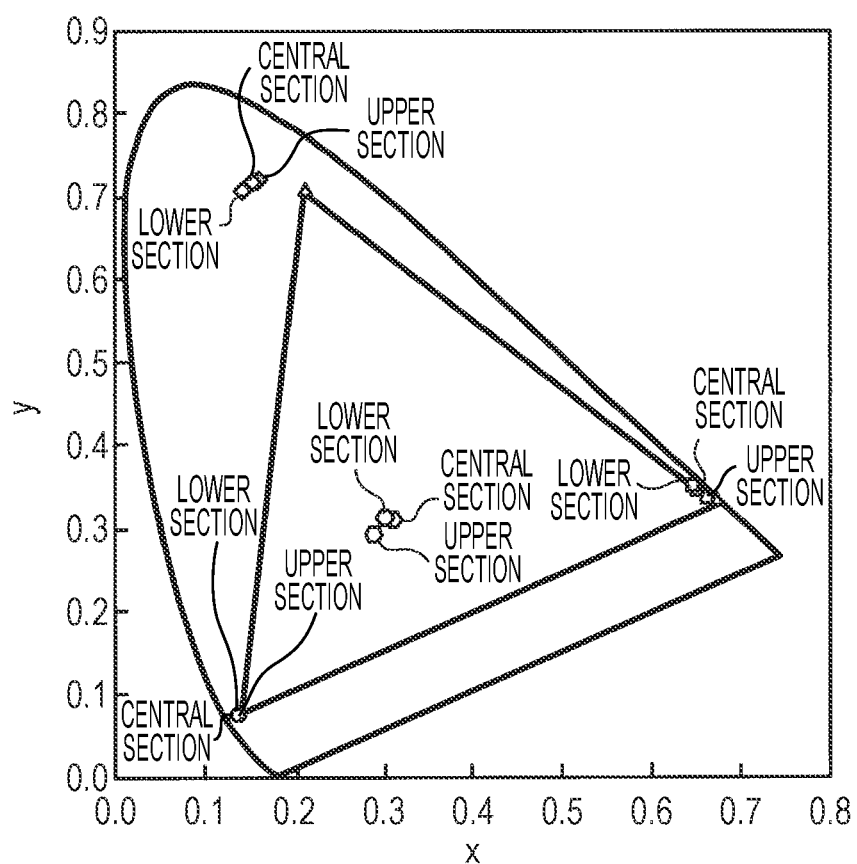
FIG. 32 is a chromaticity diagram illustrating the chromaticity of the principal ray, the light which is inclined from the principal ray by −20°, and the light which is inclined from the principal ray by +20° in the row direction of the display area according to the embodiment.

Meanwhile, FIG. 31 is a graph illustrating the spectrums of the principal ray, the light which is inclined from the principal ray by −20°, and the light which is inclined from the principal ray by +20° in the row direction (X direction) of the display area 810 according to the embodiment. FIG. 32 is a chromaticity diagram illustrating the chromaticity of the principal ray, the light which is inclined from the principal ray by −20°, and the light which is inclined from the principal ray by +20° in the row direction (X direction) of the display area 810 according to the embodiment.

As being understood from FIG. 31, in the row direction (X direction) of the display area 810, the peak wavelength of the irradiated light in each subpixel 825 is appropriate for the principal ray. As being understood from FIG. 32, the irradiated light of the overall pixel 820 becomes white color.

As being understood from FIG. 31, in the row direction (X direction) of the display area 810, the spectrums of the irradiated light in each subpixel 825 show almost the same tendency in the case where the light is inclined from the principal ray by −20° and the case where the light is inclined from the principal ray by +20°. In addition, in both cases, the shift of the irradiated light occurs in the green subpixel 825G and the extraction efficiency of the irradiated light in the red subpixel 825R is lowered. However, overall balance is excellent. As a result, as being understood from FIG. 32, the irradiated light of the overall pixel 820 becomes almost white light even in the case where the light is inclined from the principal ray.

As described above, in the embodiment, the width of overlap between the color filters 840 is caused to be different according to the positions of the subpixels 825 in the column direction (Y direction) of the display area 810. Therefore, it is possible to reduce the shift from the white color of the chromaticity of the irradiated light of the overall pixel 820 regardless of the positions of the subpixels 825 in the column direction (Y direction) of the display area 810. In other words, it is possible to reduce the shift from the white color of the chromaticity of the irradiated light of the overall pixel 820 regardless of the degree of inclination of the principal ray. As a result, in the column direction (Y direction) of the display area 810, even in a case where the subpixels 825 whose colors are different from each other are disposed to be arranged, a balance between the colors are excellent, and thus it is possible to improve the viewing angle characteristics.

In addition, in the embodiment, the color filters of the respective colors are extended in the row direction (X direction) in which the inclination of the principal ray becomes larger, and thus the color filters of the same color are disposed to be arranged in the direction. Therefore, changes in the brightness and the chromaticity according to an angle, in which the electro-optical device 80 is viewed, are suppressed in the row direction (X direction), and thus it is possible to improve the viewing angle characteristics.

Modified Example

The invention is not limited to each of the above-described embodiments, and for example, various modifications, which will be described below, are possible. In addition, it is apparent that each embodiment and each modified example may be appropriately combined.

(1) In the above-described embodiment, a configuration is described in which the color filters of the respective colors are provided to be extended in the row direction (X direction) of the display area 810, and the color filters of the same color are arranged in the row direction (X direction). However, the embodiment is not limited to the configuration. For example, the embodiment may be applied to a configuration in which the color filters of the respective colors are provided to be extended in the column direction (Y direction) of the display area 810 and the color filters of the same color are arranged in the column direction (Y direction). In this case, in the row direction (X direction), the central positions of the color filters of the respective colors may be deviated from the central positions of the light emitting elements in the respective subpixels. In addition, the width of overlap of the respective color filters in the row direction (X direction) may be different according to the positions of the subpixels in the row direction (X direction).

(2) In the above-described embodiment, the order of the subpixels in the column direction (Y direction) is set in order of the red color, the green color, and the blue color. However, the embodiment is not limited to the configuration. Another order may be used as the order of the respective subpixels in the column direction (Y direction). In this case, the width of overlap of the respective color filters may be adjusted according to the relationship between the positions of the subpixels in the column direction (Y direction) and the respective color filters.

(3) In the above-described embodiment, an OLED is used as an example of the electro-optical material. However, the embodiment is also applied to an electro-optical apparatus which uses an electro-optical material other than the OLED. The electro-optical material is a material whose optical characteristics, such as transmittance and brightness, change due to supply of an electrical signal (current signal or a voltage signal). For example, similarly to the embodiment, the invention may be applied to a display panel which uses a light emitting element, such as a liquid crystal, an inorganic EL or a light emitting polymer. In addition, similarly to the embodiment, the invention may be applied to an electrophoresis display panel using a microcapsule, which includes colored liquid and white color particles dispersed in the liquid, as the electro-optical material. Furthermore, similarly to the embodiment, the invention may be applied to a twisting-ball display panel using twisting balls, which are painted with different colors for respective areas of different polarities, as the electro-optical material. Similarly to the embodiment, the invention may be applied to various electro-optical apparatus such as a toner display panel, which uses black color toner as the electro-optical material, and a plasma display panel in which high-pressure gas, such as helium and neon, is used as the electro-optical material.

Application Example

Figure 33:
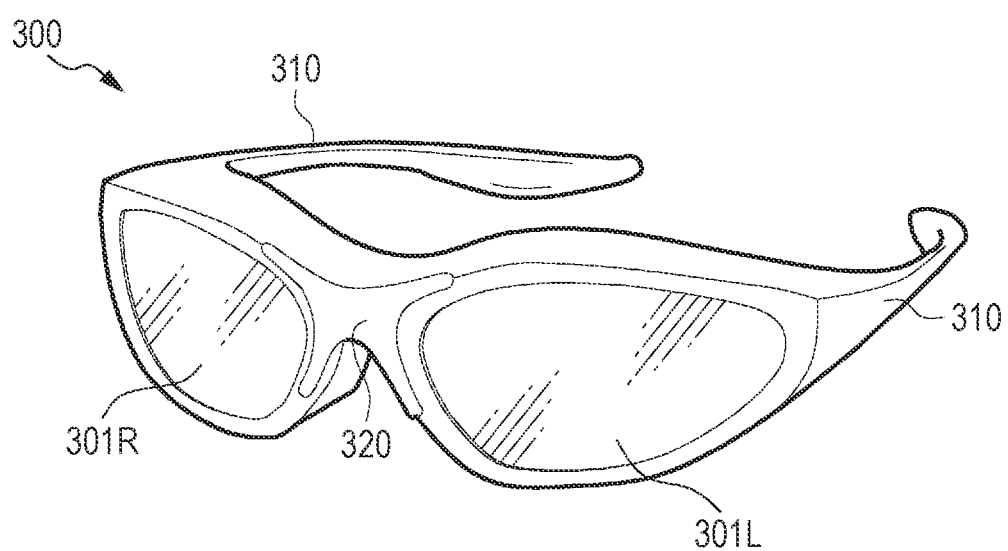
FIG. 33 is an explanatory diagram illustrating an example of an electronic apparatus.
Figure 34:
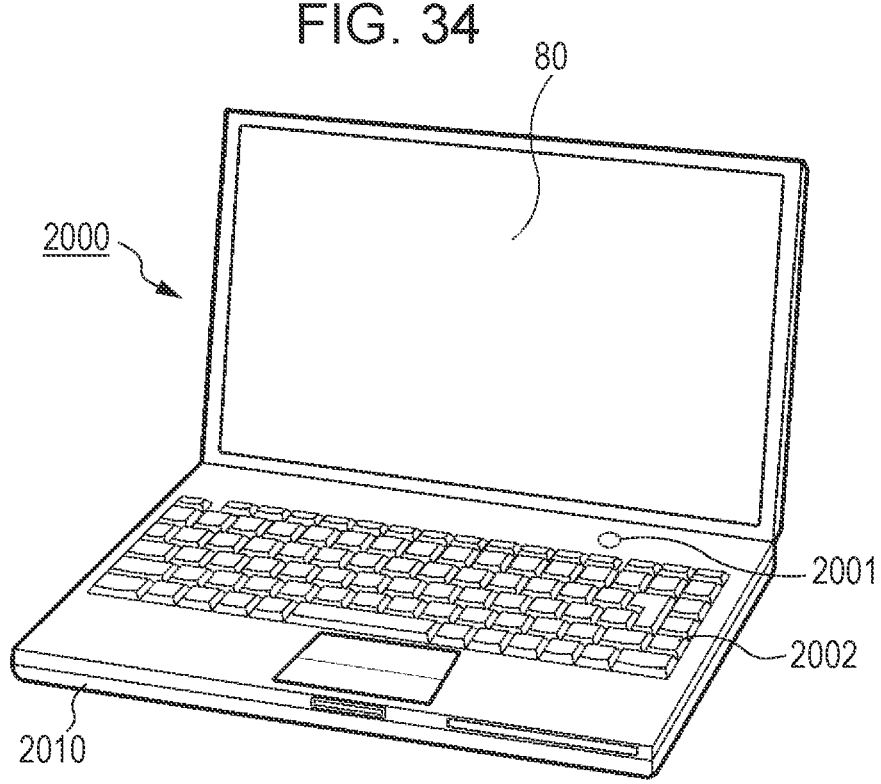
FIG. 34 is an explanatory diagram illustrating another example of the electronic apparatus.
Figure 35:
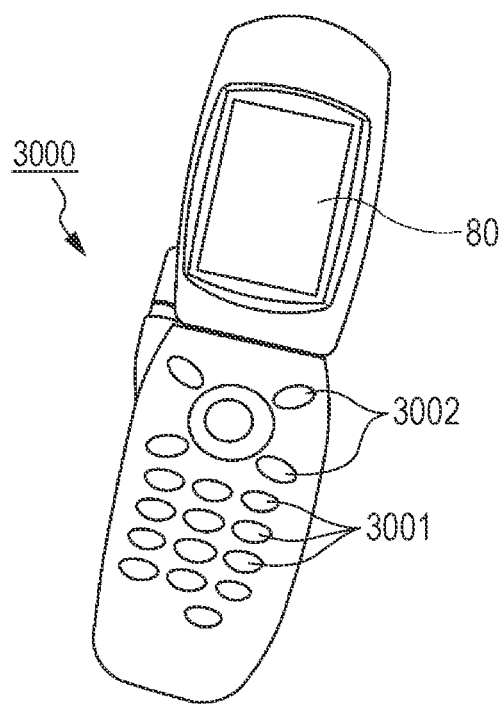
FIG. 35 is an explanatory diagram illustrating another example of the electronic apparatus.

The embodiment may be used in various electronic apparatus. FIGS. 33 to 35 illustrate detailed forms of the electronic apparatus which is an application target of the embodiment.

FIG. 33 is a perspective view illustrating an appearance of a head-mounted display as the electronic apparatus which uses the electro-optical apparatus of the embodiment. As illustrated in FIG. 33, the head-mounted display 300 includes externally temples 310, a bridge 320, and projection optical systems 301L and 301R similarly to general glasses. Although not illustrated in the drawing, a left eye electro-optical device 80 and a right eye electro-optical device 80 are provided on the back sides of the projection optical systems 301L and 301R in the vicinity of the bridge 320.

FIG. 34 is perspective view illustrating a portable personal computer which uses the electro-optical apparatus. A personal computer 2000 includes an electro-optical device 80 that displays various images, and a main body section 2010 provided with a power switch 2001 and a keyboard 2002.

FIG. 35 is a perspective view illustrating a mobile phone. The mobile phone 3000 includes a plurality of manipulation buttons 3001, scroll buttons 3002, and an electro-optical device 80 which displays various images. A screen, which is displayed on the electro-optical device 80, is scrolled by manipulating the scroll buttons 3002. The embodiment may be applied to the mobile phone.

Meanwhile, a Personal Digital Assistants (PDA) is exemplified as the electronic apparatus, to which the embodiment is applied, in addition to the apparatuses illustrated in FIG. 1 and FIGS. 33 to 35. In addition thereto, a digital-still camera, a television, a video camera, a navigation apparatus, a display device for a vehicle (inner panel), an electronic organizer, electronic paper, an electronic calculator, a word processor, a work station, a video phone, and a POS terminal may be exemplified. Furthermore, an apparatus which includes a printer, a scanner, a copy machine, a video player, and a touch panel, or the like may be exemplified.

The entire disclosure of Japanese Patent Application No. 2016-026413, filed Feb. 15, 2016 is expressly incorporated by reference herein.

What is claimed is:
1. An electro-optical apparatus comprising:
a first pixel including:
a first light emitting element; and
a first color filter;
a second pixel including:
a second light emitting element; and
a second color filter;
a third pixel including:
a third light emitting element; and
a third color filter disposed to overlap the first color filter in a first direction in plan view;
a fourth pixel including:
a fourth light emitting element; and
a fourth color filter disposed to overlap the second color filter in the first direction in plan view,
wherein a central position of the first color filter is deviated from a central position of the first light emitting element in the first direction,
wherein a central position of the second color filter coincides with a central position of the second light emitting element in the first direction,
wherein a first overlap width of the first color filter and the third color filter is different from a second overlap width of the second color filter and the fourth color filter,
wherein the first light emitting element, the first color filter, the third light emitting element and the third color filter are included in a first section of a display area, and
wherein the second light emitting element, the second color filter, the fourth light emitting element and the fourth color are included in a second section of the display area oriented more centrally on the display area than is the first section.

2. The electro-optical apparatus according to claim 1, further comprising:
a fifth pixel including:
a fifth light emitting element; and
a fifth color filter; and
a sixth pixel including:
a sixth light emitting element; and
a sixth color filter the sixth color filter disposed to overlap the fifth color filter in the first direction in plan view,
wherein a central position of the fifth color filter is deviated from a central position of the fifth light emitting element in the first direction,
wherein the fifth light emitting element, the fifth color filter, the sixth light emitting element and the sixth color filter are included in a third section of the display area, and
wherein the second section is oriented more centrally on the display area than is the third section.

3. The electro-optical apparatus according to claim 2, wherein the second color filter is disposed between the first color filter and the fifth color filter in plan view.

4. The electro-optical apparatus according to claim 3, wherein the third color filter is disposed between the first color filter and the second color filter in plan view, wherein the fourth color filter is disposed between the second color filter and the fifth color filter in plan view, and
wherein the fifth color filter is disposed between the fourth color filter and the sixth color filter in plan view.

5. The electro-optical apparatus according to claim 4, wherein a third overlap width of the fifth color filter and the sixth color filter is different from the second overlap width of the second color filter and the fourth color filter.

6. The electro-optical apparatus according to claim 5, wherein the first color filter, the second color filter, and the fifth color filter are red color filters,
wherein the third color filter, the fourth color filter, and the sixth color filter are green color filters, and
wherein the third overlap width is smaller than the first overlap width.

7. The electro-optical apparatus according to claim 5, wherein the first color filter, the second color filter, and the fifth color filter are green color filters,
wherein the third color filter, the fourth color filter, and the sixth color filter are blue color filters, and
wherein the third overlap width is larger than the first overlap width.

8. The electro-optical apparatus according to claim 5,
   wherein the first color filter, the second color filter, and the fifth color filter are blue color filters,
   wherein the third color filter, the fourth color filter, and the sixth color filter are red color filters, and
   wherein the third overlap width is smaller than the first overlap width.

9. An electronic apparatus comprising the electro-optical apparatus according to claim 1.

10. An electronic apparatus comprising the electro-optical apparatus according to claim 2.

11. An electronic apparatus comprising the electro-optical apparatus according to claim 3.

12. An electronic apparatus comprising the electro-optical apparatus according to claim 4.

13. An electronic apparatus comprising the electro-optical apparatus according to claim 5.

14. An electronic apparatus comprising the electro-optical apparatus according to claim 6.

15. An electronic apparatus comprising the electro-optical apparatus according to claim 7.

16. An electronic apparatus comprising the electro-optical apparatus according to claim 8.

\* \* \* \* \*